(12) United States Patent
Gimzewski et al.

(10) Patent No.: US 9,678,105 B2
(45) Date of Patent: Jun. 13, 2017

(54) ANALYSIS OF EX VIVO CELLS FOR DISEASE STATE DETECTION AND THERAPEUTIC AGENT SELECTION AND MONITORING

(71) Applicant: The Regents of the University of California, Oakland, CA (US)

(72) Inventors: James K. Gimzewski, Topanga, CA (US); Sarah E. Cross, El Granada, CA (US); Yusheng Jin, North Hills, CA (US); Jianyu Rao, Culver City, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 398 days.

(21) Appl. No.: 14/146,961

(22) Filed: Jan. 3, 2014

(65) Prior Publication Data

US 2014/0123347 A1    May 1, 2014

Related U.S. Application Data

(62) Division of application No. 12/993,826, filed as application No. PCT/US2008/085194 on Dec. 1, 2008, now Pat. No. 8,652,798.

(Continued)

(51) Int. Cl.
*G01N 3/08*    (2006.01)
*G01Q 30/02*    (2010.01)
(Continued)

(52) U.S. Cl.
CPC ............ *G01Q 30/025* (2013.01); *B82Y 15/00* (2013.01); *B82Y 35/00* (2013.01); *G01Q 20/00* (2013.01);
(Continued)

(58) Field of Classification Search
CPC .... G01Q 30/025; G01Q 20/00; G01Q 60/366; Y10S 977/92; Y10S 977/923
(Continued)

(56) References Cited

U.S. PATENT DOCUMENTS 5,463,897 A * 11/1995 Prater et al. ........... B82Y 35/00
                                                           73/105
6,357,285 B1    3/2002 Allen
(Continued)

OTHER PUBLICATIONS

Authors: Alain Kamgoué, Jacques Ohayon and Philippe Tracqui, Title:"Estimation of Cell Young's Modulus of Adherent Cells Probed by Optical and Magnetic Tweezers: Influence of Cell Thickness and Bead Immersion", Date: Aug. 2007, Publisher: ASME, Journal of Biomechanical Engineering, pp. 523-530.*

(Continued)

*Primary Examiner* — Harshad R Patel
*Assistant Examiner* — Roger Hernandez-Prewit
(74) *Attorney, Agent, or Firm* — Foley & Lardner LLP; Cliff Z. Liu

(57) ABSTRACT

Described herein is the analysis of nanomechanical characteristics of cells. In particular, changes in certain local nanomechanical characteristics of ex vivo human cells can correlate with presence of a human disease, such as cancer, as well as a particular stage of progression of the disease. Also, for human patients that are administered with a therapeutic agent, changes in local nanomechanical characteristics of ex vivo cells collected from the patients can correlate with effectiveness of the therapeutic agent in terms of impeding or reversing progression of the disease. By exploiting this correlation, systems and related methods can be advantageously implemented for disease state detection and therapeutic agent selection and monitoring.

18 Claims, 8 Drawing Sheets

Related U.S. Application Data

(60) Provisional application No. 61/054,787, filed on May 20, 2008, provisional application No. 61/055,416, filed on May 22, 2008.

(51) Int. Cl.
  B82Y 35/00 (2011.01)
  G01Q 60/36 (2010.01)
  B82Y 15/00 (2011.01)
  G01Q 20/00 (2010.01)
  G01Q 30/14 (2010.01)

(52) U.S. Cl.
  CPC .......... *G01Q 60/366* (2013.01); *G01Q 30/14* (2013.01); *Y10S 977/92* (2013.01)

(58) Field of Classification Search
  USPC .................. 73/818; 850/5, 6, 9, 10; 977/923
  See application file for complete search history.

(56) References Cited

U.S. PATENT DOCUMENTS

| | | | |
|---|---|---|---|
| 6,762,056 B1* | 7/2004 | Peeters | B82Y 5/00 436/86 |
| 6,894,272 B2 | 5/2005 | Kranz et al. | |
| 2003/0219768 A1 | 11/2003 | Beebe et al. | |
| 2005/0239047 A1* | 10/2005 | Gimzewski et al. | B82Y 35/00 435/4 |

OTHER PUBLICATIONS

ATTC.org, BALB/3T3 Clone A31 ATCC ® CCL-163™ Mus Musculus Embryo Sarco; Characteristics, Jun. 20, 2013.
Bedrossian, C.W.M. "Malignant Effusions: A Multimodal Approach to Cytologic Diagnosis," Igaku-Shion Medical Publishers, Inc., 1994, 275 pages. (Book Review only, Michael W. Stanley, M.D., Acta Cytol., pp. 880).
Bercoff, J., et al. "In vivo breast tumor detection using transient elastography," Ultrasound in Medicine & Biology, 2003, vol. 2, No. 10, pp. 1387-1396.
Bhadriraju, K, et al., "Extracellular Matrix- and Cytoskeleton-Dependent Changes in Cell Shape and Stiffness," Experimental Cell Research, 2002, vol. 278, No. 1, pp. 92-100.
Bussemakers, M.J.G., et al., "The role of cell adhesion molecules and proteases in tumor invasion and metastasis," World J Urol, 1996, vol. 14, pp. 151-156.
Charras, G.T., et al., "Single cell mechanotransduction and its modulation analyzed by atomic force microscopy indentation," Biopnys. J., 2002, vol. 82, pp. 2970-2981.
Collinsworth, A.M., et al., "Apparent elastic modulus and hysteresis of skeletal muscle cells throughout differentiation,", Am J Physiol Cell Physiol, Oct. 2002, vol. 283, pp. C1219-C1227.
Cross, S.E., et al., "Nanomechanical analysis of cells from cancer patients," Nature Nanotechnology, Dec. 2007, vol. 2, pp. 780-783.
Cross, S.E., et al., "Nanomechanical properties of glucans and associated cell-surface adhesion of *Streptococcus* mutans probed by atomic force microscopy under in situ conditions," Microbiology, 2007, vol. 153, pp. 3124-3132.
Dao, M., et al., "Mechanics of the human red blood cell deformed by optical tweezers," J. Mech. Phys. Solids, 2003, vol. 51, pp. 2259-2280.
Discher, D., et al., "Tissue cells feel and respond to the stiffness of their substrate," Science, 2005, vol. 310, pp. 1139-1143.
Dufrene, Y.F., "Atomic Force Microscopy, a Powerful Tool in Microbiology," J. Bacteriol. Oct. 2002, vol. 184, No. 19, pp. 5205-5213.
Elson, E.L., "Cellular Mechanics as an Indicator of Cytoskeletal Structure and Function," Ann. Rev. Biophys. Biophys. Chem., 1988, vol. 17, pp. 397-430.
Fisher, T.E., et al., "Stretching single molecules into novel conformations using the atomic force microscope," Nature Structural Biology, Sep. 2000, Vo. 7, No. 9, pp. 719-724.
Guck, J., et al., "Optical deformability as an inherent cell marker for testing malignant transformation and metastatic competence," Biophys. J. 2005, vol. 88, pp. 3689-3698.
Hansma, P.K., et al., "Tapping mode atomic force microscopy in liquids," Appl. Phys. Lett., Mar. 28, 1994, vol. 64, No. 13, pp. 1738-1740.
International Search Report received for PCT/US08/85194 dated Jan. 29, 2009.
Johnson, C.P. et al., "Forced Unfolding of Proteins Within Cells," Science, vol. 317, Aug. 3, 2007, pp. 663-666.
Lee, J., et al., "How do cells move along surfaces?" Trends Cell Biol., Nov. 3, 1993, vol. 3, pp. 366-370.
Lekka, M., et al., "Elasticity of normal and cancerous human bladder cells studied by scanning force microscopy," Eur Biophys J, 1999, vol. 28, pp. 312-316.
Levy, R., et al., "Measuring the spring constant of atomic force microscope cantilevers: thermal fluctuations and other methods," Nanotechnology, 2002, vol. 13, pp. 33-37.
Lu, Q., et al., "Green Tea Extract Modulates Actin Remodeling via Rho Activity in an In vitro Multistep Carcinogenic Model," Clin Cancer Res, 2005, vol. 11, pp. 1675-1683.
Matzke, R., et al., "Direct, high-resolution measurement of furrow stiffening during division of adherent cells," Nature Cell Biol., Jun. 2001, vol. 3, pp. 607-610.
McKnight, A.L., et al., "MR Elastography of Breast Cancer: Preliminary Results," AJR, Jun. 2002, vol. 178, pp. 1411-1417.
Morris, S., et al., "The self-assembly of plant cell wall components by single-molecule force spectroscopy and Monte Carlo modelling," Nanotechnology, 2004, vol. 15, pp. 1296-1301.
Motherby, H., et al., "Pleural Carcinosis Confirmed by Adjuvant Cytological Methods: A Case Report," Diagnostic Cytopathology, 1998, vol. 19, No. 5, pp. 370-374.
Osterheld, M., et al., "Image Cytometry: An Aid for Cytological Diagnosis of Pleural Effusions," Diagnostic Cytopathology, 2005, vol. 32, No. 3, pp. 173-176.
Pelling, A.E., et al, "Nanoscale visualization and characterization of Myxococcus xanthus cells with atomic force microscopy," Proc. Natl Acad. Sci, USA, May 3, 2005, vol. 102, pp. 6484-6489.
Pelling, A.E., et al., "Local nanomechanical motion of the cell wall of *Saccharomyces cerevisiae*," Science, 2004, vol. 305, pp. 1147-1150.
Politi, E., et al., "Immunocytochemical Panel for Distinguishing Between Carcinoma and Reactive Mesothelial Cells in Body Cavity Fluids," Diagnostics Cytopathology, 2005, vol. 32, No. 3, pp. 151-155.
Public Health of England 2013, General Cell Collection: SV-T2, Jun. 20, 2013.
Radmacher, M. "Measuring the elastic properties of biological samples with the AFM," IEEE Eng. Med. Biol. Mag., 1997, vol. 16, pp. 47-57.
Rao, J.Y., et al., "Microfilament Actin Remodeling as a Potential Target for Cancer Drug Development," Current Cancer Drug Targets, Jun. 2004, vol. 4, No. 4, pp. 345-354.
Rief, M., et al., "Reversible Unfolding of Individual Titin Immunoglobulin Domains by AFM," Science, May 16, 1997, vol. 276, pp. 1109-1112.
Rotsch, C., et al., "AFM Imaging and Elasticity Measurements on Living Rat Liver Macrophages," Cell Biology International, 1997, vol. 21, No. 11, pp. 685-696.
Rotsch, C., et al., "Dimensional and mechanical dynamics of active and stable edges in motile fibroblasts investigated by using atomic force microscopy," Proc. Natl. Acad. Sci, Feb. 1999, vol. 96, pp. 921-926.
Rotsch, C., et al., "Drug-Induced Changes of Cytoskeletal Structure and Mechanics in Fibroblasts: An Atomic Force Microscopy Study," Biophysical Journal, Jan. 2000, vol. 78, pp. 520-535.
Salgia, R., et al., "Expression of the focal adhesion protein paxillin in lung cancer and its relation to cell motility," Oncogene, 1999, vol. 18, pp. 67-77.

(56) References Cited

OTHER PUBLICATIONS

Sen, S. et al., "Indentation and Adhesive Probing of a Cell Membrane with AFM: Theoretical Model and Experiments," Biophysical Journal, Nov. 2005, vol. 89, pp. 3203-3213.
Sokolov, et al., "Atomic force microscopy in cancer cell research", Cancer Nanotechnology, Chapter 1, pp. 1-17, (2006).
Stolz, M., et al., "Dynamic Elastic Modulus of Porcine Articular Cartilage Determined at Two Different Levels of Tissue Organization by Indentation-Type Atomic Force Microscopy," Biophysical Journal, May 2004, vol. 86, pp. 3269-3283.
Suresh, S., "Biomechanics and biophysics of cancer cells," Acta Materialia, 2007, vol. 55, pp. 3989-4014.
Suresh, S., "Elastic clues in cancer detection," Nature Nanotechnology, Dec. 2007, vol. 2, pp. 748-749.
Suresh, S., et al., "Connections between single-cell biomechanics and human disease states: gastrointestinal cancer and malaria," Acta Biomaterialia, 2005, vol. 1, pp. 15-30.
Touhami, A., et al., "Nanoscale Mapping of the Elasticity of Microbial Cells by Atomic Force Microscopy," Langmuir, 2003, vol. 19, pp. 4539-4543.
Van Der AA, B.C., et al., "Stretching Cell Surface Macromolecules by Atomic Force Microscopy," Langmuir, 2001, vol. 17, pp. 3116-3119.
Wikipedia, Categories: Hepatology/Neoplasm Stubs; "Focal Nodular Hyperplasia", Retrieved from Wikipedia.org webpage, Jul. 10, 2013.
Wu, H.W., et al., "Mechanical properties of 1929 cells measured by atomic force microscopy: effects of anticytoskeletal drugs and membrane crosslinking," Scanning, 1998, vol. 20, pp. 389-397.
Yamazaki, D., et al., "Regulation of cancer cell motility through actin reorganization," Cancer Sci., Jul. 2005, vol. 96, No. 7, pp. 379-386.
Tilleman, et al., "The Elastic properties of cancerous skin: Poisson's ratio and Young's modulus", IMAJ, vol. 6, pp. 753-755, (2004).
Yeh, et al., "Young's modulus measurements of human liver and correlation with pathological findings," IEEE Ultrasonics Symposium, pp. 1233-1236, (2001).

\* cited by examiner

ANALYSIS OF EX VIVO CELLS FOR DISEASE STATE DETECTION AND THERAPEUTIC AGENT SELECTION AND MONITORING

CROSS REFERENCE TO RELATED APPLICATIONS

This application is a divisional of U.S. patent application Ser. No. 12/993,826, which is a National Stage Entry of PCT/US2008/085194, filed on Dec. 1, 2008, which claims the benefit of U.S. Provisional Application Ser. No. 61/054,787, filed on May 20, 2008, and the benefit of U.S. Provisional Application Ser. No. 61/055,416, filed on May 22, 2008, the disclosures of which are incorporated herein by reference in their entireties.

STATEMENT REGARDING FEDERALLY SPONSORED RESEARCH OR DEVELOPMENT

This invention was made with Government support under Grant Number CA096116 and GM074509, awarded by the National Institutes of Health. The Government has certain rights in the invention.

FIELD OF THE INVENTION

The invention relates generally to the analysis of nanomechanical characteristics of cells. More particularly, the invention relates to such analysis for disease state detection and therapeutic agent selection and monitoring.

BACKGROUND

Reliable diagnosis of a human disease, such as cancer, has the potential to alert health care providers to early onset of the disease. For many types of cancers, early detection can lead to early treatment, which, in turn, can significantly improve recovery and survival rates. Typically, cancer diagnosis relies on morphological examination of exfoliated or aspirated cells or surgically removed tissue samples. While considered as the "gold standard," diagnosis based on morphological examination can be difficult and unreliable. In the case of metastatic adenocarcinoma, metastatic cancer cells and benign reactive mesothelial cells typically have similar morphological characteristics, thereby rendering differentiation between the two types of cells both time-consuming and prone to errors. Indeed, certain studies have shown that morphological examination alone (i.e., without any ancillary test) has an accuracy in the range of 50 percent to 70 percent with respect to diagnosing cancer in body cavity fluids. Due to this inaccuracy, various ancillary tests have been used in conjunction with morphological examination, such as histochemical, immunohistochemical, and ultrastructural tests. However, these ancillary tests themselves can be prone to errors with respect to diagnosing metastatic adenocarcinoma, and are typically considered as unsuitable for diagnosing other types of metastatic cancers, such as squamous cell carcinoma, melanoma, and sarcoma. Moreover, these ancillary tests often involve collection of relatively large quantities of samples that may not be readily available.

The past several years have seen considerable interest in identifying links between nanomechanical characteristics of cells and human diseases, and changes in nanomechanical characteristics of cells have recently emerged as a potential biomarker for diagnosis of human diseases. For example, the cytoskeleton is a subcellular structure of filaments and microtubules that provide a cell its shape, and the cytoskeleton influences both global and local nanomechanical characteristics of the cell. During malignant transformation, the cytoskeleton is dynamically altered or remodeled, which, in turn, can lead to changes in nanomechanical characteristics of the cell. Despite the progress that has been made, results of previous work remain lacking with respect to the goal of reliably diagnosing a disease state of living and substantially unmodified human cells, such as those that might be collected in a clinical setting. In particular, previous work has shown variability in nanomechanical characteristics among cells obtained from cell lines. However, because cell lines have been modified to render them immortal, results derived from cell lines typically cannot be readily extrapolated to predict results in an actual clinical setting for ex vivo human cells. In addition, previous work has shown a correlation in whole cell nanomechanical characteristics with respect to cancer cells and benign cells. However, because the observed correlation is slight, results indicate that whole cell or global measurements may not be sufficiently reliable for use in an actual clinical setting.

It is against this background that a need arose to develop the nanomechanical analysis and related systems and methods described herein.

SUMMARY

One aspect of the invention relates to a nanomechanical analysis method. In one embodiment, the method includes: (1) detecting a response of a biological sample to a probing element, the biological sample including a set of ex vivo cells; (2) based on the response, determining a set of test values for the biological sample, the set of test values being indicative of at least one of the Young's modulus and adhesiveness of the set of ex vivo cells; (3) comparing the set of test values with a set of reference values to determine a degree of correspondence between the set of test values and the set of reference values, the set of reference values being associated with at least one of a population of cancerous cells and a population of non-cancerous cells; and (4) based on the degree of correspondence, producing a visual indication of a biological state of the biological sample.

Another aspect of the invention relates to a computer-readable storage medium. In one embodiment, the computer-readable storage medium includes executable instructions to: (1) calculate a first set of test values for a first set of ex vivo cells, the first set of test values being indicative of at least one of the Young's modulus and adhesiveness of the first set of ex vivo cells, the first set of ex vivo cells being collected from a human patient prior to administering a therapeutic agent; (2) calculate a second set of test values for a second set of ex vivo cells, the second set of test values being indicative of at least one of the Young's modulus and adhesiveness of the second set of ex vivo cells, the second set of ex vivo cells being collected from the human patient subsequent to administering the therapeutic agent; (3) determine a degree of correspondence between the first set of test values and the second set of test values; and (4) based on the degree of correspondence between the first set of test values and the second set of test values, produce an indication of effectiveness of the therapeutic agent for the human patient.

A further aspect of the invention relates to a nanomechanical analysis system. In one embodiment, the system includes: (1) an expansion element; (2) a cantilever having a first end and a second end, the first end of the cantilever being connected to the expansion element; (3) a probe disposed adjacent to the second end of the cantilever, the probe being elongated and extending from the cantilever towards an upper surface of a cell to be analyzed; (4) a detector element disposed adjacent to the second end of the cantilever; and (5) an optical microscope disposed adjacent to a lower surface of the cell. The optical microscope is configured to provide visual examination of the cell to position the probe with respect to a central region of the cell. The expansion element is configured to move the first end of the cantilever, such that the probe applies a stimulus to the cell, and the detector element is configured to produce an output indicative of an extent of deflection of the second end of the cantilever in accordance with a response of the cell to the stimulus.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings. In the drawings, like reference numbers denote like elements, unless the context clearly dictates otherwise.

DETAILED DESCRIPTION

Overview

Figure 1:
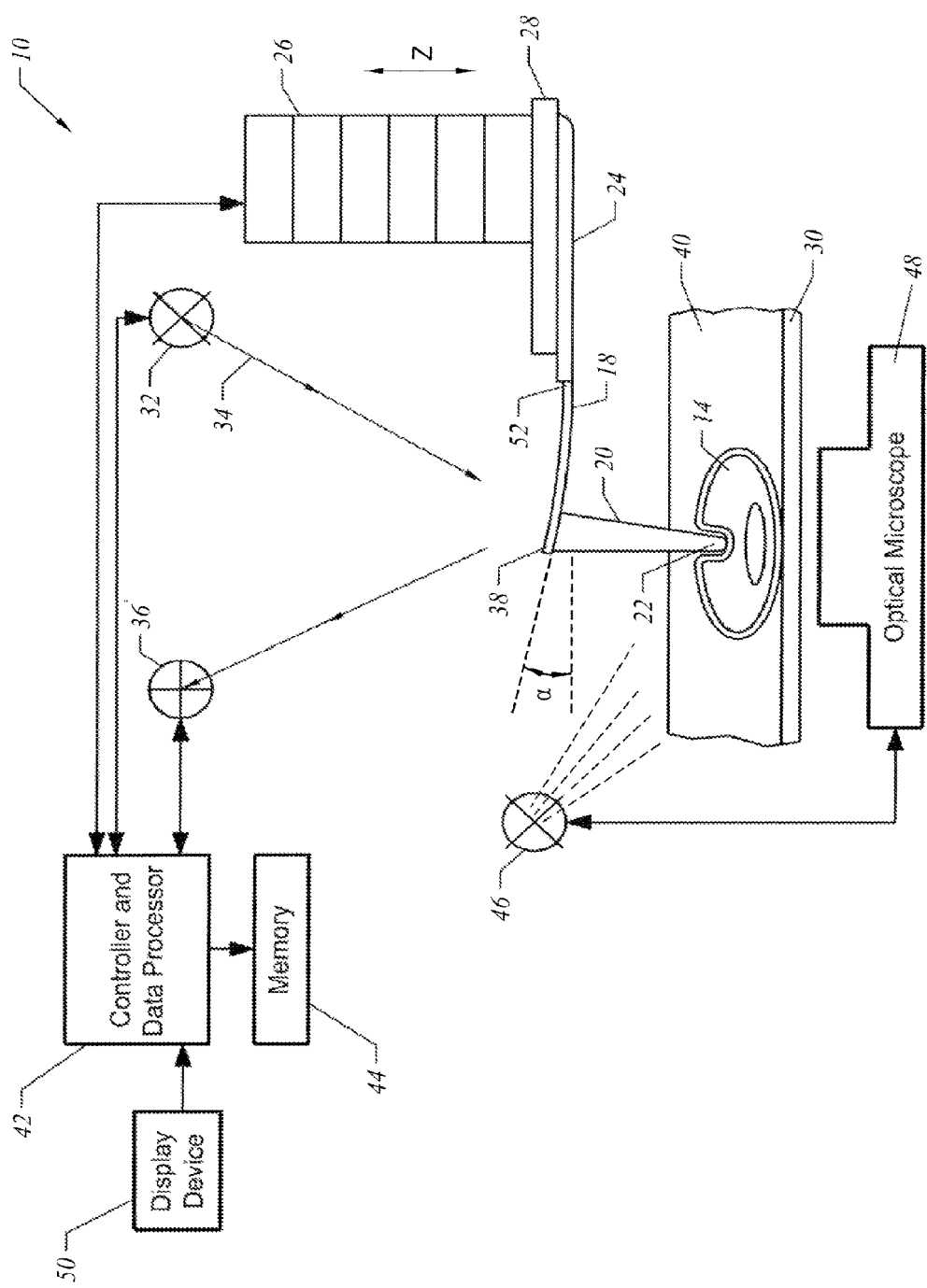
FIG. 1 illustrates a nanomechanical analysis system implemented in accordance with an embodiment of the invention.

Embodiments of the invention relate generally to the analysis of nanomechanical characteristics of cells. In particular, changes in certain local nanomechanical characteristics of ex vivo human cells can correlate with presence of a human disease, such as cancer, as well as a particular stage of progression of the disease. By exploiting this correlation, some embodiments of the invention can be advantageously used for disease state detection and therapeutic agent selection. Also, for human patients that are administered with a therapeutic agent, changes in local nanomechanical characteristics of ex vivo cells collected from the patients can correlate with effectiveness of the therapeutic agent in terms of impeding or reversing progression of the disease. By exploiting this correlation, some embodiments of the invention can be advantageously used for therapeutic agent monitoring.

Definitions

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the term "adjacent" refers to being near or adjoining. Adjacent objects can be spaced apart from one another or can be in actual or direct contact with one another. In some instances, adjacent objects can be connected to one another or can be formed integrally with one another.

As used herein, the terms "inner," "outer," "upper," "upwardly," "lower," "downwardly," "lateral," and "laterally" refer to a relative orientation of a set of objects, such as in accordance with the drawings, but do not require a particular orientation of those objects during manufacturing or use.

As used herein, the terms "connect," "connected," and "connection" refer to an operational coupling or linking. Connected objects can be directly coupled to one another or can be indirectly coupled to one another, such as via another set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein with reference to a cell, the term "membrane" refers to a barrier or an interface between a cytoplasm of the cell and an extracellular environment. A cell membrane typically includes a lipid bilayer along with other biological constituents, such as polypeptides, glycoproteins, lipoproteins, and polysaccharides.

As used herein, the terms "patient" and "subject" refer to a biological system from which a biological sample can be collected or to which a therapeutic agent can be administered. A patient can refer to a human patient or a non-human patient. Patients can include those that are healthy and those having a disease, such as cancer. Patients having a disease can include patients that have been diagnosed with the disease, patients that exhibit a set of symptoms associated with the disease, and patients that are progressing towards or are at risk of developing the disease.

As used herein, the term "biological sample" refers to a biological material that can be collected from a patient and used in connection with diagnosis or monitoring of biological states. Biological samples can include clinical samples, including body fluid samples, such as body cavity fluids, urinary fluids, cerebrospinal fluids, blood, and other liquid samples of biological origin; and tissue samples, such as biopsy samples, primary tumor samples, and other solid samples of biological origin. Biological samples can also include those that are manipulated in some way after their collection, such as by treatment with reagents, culturing, solubilization, enrichment for certain biological constituents, cultures or cells derived therefrom, and the progeny thereof.

As used herein, the term "biological state" refers to a condition associated with a patient or associated with a biological sample collected from the patient. A biological state can refer to a healthy state, which corresponds to a normal condition in the substantial absence of a disease, or a disease state, which corresponds to an abnormal or harmful condition associated with a disease. Examples of disease states include conditions associated with cancer, such as substantially uncontrolled growth, invasion, and metastasis. As used herein with reference to a biological sample collected from a patient, a biological state can refer to an ex vivo state, which corresponds to a condition in which the biological sample is substantially unmodified with respect to its natural or in vivo condition within the patient. For certain applications, a biological sample can be considered to be substantially unmodified with respect to its natural condition if a particular nanomechanical characteristic of the biological sample substantially match a corresponding characteristic of the biological sample in its natural condition, such as, for example, exhibiting a difference of less than 20 percent, less than 10 percent, or less than 5 percent with respect to the corresponding characteristic in its natural condition. Ex vivo biological samples can include those that are manipulated in some way after their collection, so long as the biological samples remain substantially unmodified with respect to their natural conditions. In the case of cells, ex vivo cells are typically living and substantially unmodified cells that can be contrasted with cells obtained from cell lines, which are typically modified to render them immortal.

As used herein, the term "therapeutic agent" refers to a treatment that can be administered to a patient, whether or not effective with respect to an intended purpose or target of the treatment. Therapeutic agents can include compounds of varying degrees of complexity that can influence a biological state, such as small molecules of therapeutic interest; naturally-occurring factors such as endocrine, paracrine, or autocrine factors or factors interacting with cell receptors of any type; intracellular factors such as those involved in intracellular signaling pathways; and factors isolated from other natural sources. Therapeutic agents can also include agents used in gene therapy, such as DNA and RNA. Also, antibodies, viruses, bacteria, and bioactive agents produced by bacteria and viruses can be considered as therapeutic agents. For certain applications, a therapeutic agent can include a composition including a set of active ingredients and a set of excipients.

As used herein, the terms "cancer," "cancerous," "malignancy," "malignant," and "tumor" refer to a disease in which certain cells exhibit relatively autonomous growth, so that the cells exhibit an aberrant growth phenotype characterized by a significant loss of control with respect to cell proliferation.

As used herein, the term "size" refers to a characteristic dimension. In the case of an object that is circular or spherical, a size of the object can refer to a diameter of the object, with the diameter being twice a radius of the object. In the case of an object having a non-uniform shape, a size of the object can refer to an average of various orthogonal dimensions of the object. Thus, for example, a size of an object that is elliptical or spheroidal can refer to an average of a major axis and a minor axis of the object. When referring to a set of objects as having a particular size, it is contemplated that the objects can have a distribution of sizes around that size. Thus, as used herein, a size of a set of objects can refer to a typical size of a distribution of sizes, such as a mean size, a median size, or a peak size.

Nanomechanical Analysis System

Certain embodiments of the invention are directed to determining nanomechanical characteristics of cells, such as ex vivo human cells, for the purpose of diagnosis, prediction, or monitoring of biological states. One example of a nanomechanical characteristic is the Young's modulus or the modulus of elasticity. The Young's modulus of a material is a measure of elasticity or stiffness of the material, and, typically, can be expressed as a ratio of an applied stress, such as an applied pressure, relative to a deformation or strain response within an elastic range of the material. If sufficient pressure is applied to a surface of a material, a displacement or movement of the surface typically occurs. If the applied pressure does not exceed an elastic limit of the material, the surface typically returns to its previous position once the applied pressure is removed. In the case of a cell, the Young's modulus can be at least partially influenced by the cytoskeleton of the cell. During malignant transformation, the cytoskeleton can be dynamically altered or remodeled, which, in turn, can lead to changes in the Young's modulus of the cell.

Another example of a nanomechanical characteristic is adhesiveness. The adhesiveness of a surface of a material is a measure of a tendency of the surface to attach or cling to another surface and, typically, can be expressed as an amount of force to detach or separate the surfaces once attached to one another. In the case of a cell, an adhesiveness of the cell can be at least partially influenced by biological constituents of a cell membrane. During malignant transformation, the nature or composition of the biological constituents can be dynamically altered or remodeled, which, in turn, can lead to changes in the adhesiveness of the cell.

According to some embodiments of the invention, a nanomechanical characteristic of a cell is determined by applying a stimulus or perturbation to the cell, detecting a response of the cell to the stimulus, and then calculating the nanomechanical characteristic of the cell based on its response. In some embodiments, a stimulus is applied by contacting a cell membrane with a probing element, and a resulting movement of the cell membrane is detected. Movement of the cell membrane can include lateral movement, vertical movement, stretching, contracting, or a combination thereof, and detection of the movement can be accomplished by implementing the probing element and associated components so as to be responsive to the movement. In turn, the nature and extent of the movement can be used to calculate a nanomechanical characteristic of the cell, such as its Young's modulus. In other embodiments, a stimulus is applied by contacting a cell membrane with a probing element, and a resulting interaction of the cell membrane with the probing element is detected. Interaction of the cell membrane can include attachment to the probing element, rupturing of the cell membrane, or a combination thereof, and detection of the interaction can be accomplished by implementing the probing element and associated components so as to be responsive to the interaction. In turn, the nature and extent of the interaction can be used to calculate a nanomechanical characteristic of the cell, such as its adhesiveness.

In some embodiments, movement or interaction of a cell membrane is detected using an Atomic Force Microscope ("AFM") operating in a contact mode. An AFM typically includes a spring element, such as a cantilever having one end adjacent to a cantilever body and another end adjacent to a probe or protrusion. The probe is elongated and extends along a direction substantially orthogonal to a lengthwise direction of the cantilever. A tip of the probe is positioned so as to be in contact with a cell, and serves as a mechanism for applying a stimulus to the cell. Movement of the cell membrane results in movement of the cantilever, such as in the form of deflection of the cantilever relative to a horizontal plane. Since a spring constant of the cantilever can be determined, an amount of pressure applied to the cell membrane can be determined based on the extent of deflection of the cantilever as a force is applied through the cantilever to the tip and, eventually, as pressure to the cell membrane. The force applied to the tip can be adjusted until a sufficient amount of pressure is applied to the cell membrane, and an elastic response of the cell is then determined. Similarly, attachment of the cell membrane to the tip results in movement of the cantilever, such as in the form of deflection of the cantilever relative to the horizontal plane. Since the spring constant of the cantilever can be determined, a detachment force to separate the tip from the cell membrane can be determined based on the extent of deflection of the cantilever as the tip is moved away from the cell. It will be appreciated that, while a spring element is sometimes referred to herein as a cantilever, the spring element can be implemented in a number of other ways, such as a coil spring, a torsion spring, or a leaf spring. Also, while a probing element is sometimes referred to herein as an AFM probe, the probing element is generally any elongated structure that can be used to apply a stimulus to a cell. Moreover, while some embodiments are described with reference to an AFM, it will be appreciated that other types of scanning probe microscopes or force-distance measuring devices can be used.

Desirably, an AFM tip is positioned adjacent to a central or nuclear region of a cell and is sized so as to allow determination of an inherent nanomechanical characteristic of the cell, with little or no influence from a substrate supporting the cell. If the tip is positioned near an edge of the cell or is sized beyond a certain extent, the tip can sometimes encounter resistance from the substrate before sufficiently engaging a cell membrane, thereby yielding a result that can differ from an inherent nanomechanical characteristic of the cell. Also, an AFM tip is desirably sized so as to allow determination of a local nanomechanical characteristic of a cell, rather than a corresponding whole cell or global characteristic, since the local nanomechanical characteristic can exhibit a greater correlation with respect to presence of a human disease or with respect to a particular stage of the disease. Human cells of interest typically have sizes in the range of about 9 micrometer ("μm") to about 30 μm, and associated nuclear regions typically have sizes in the range of about 3 μm to about 10 μm. Accordingly, for some embodiments, a radius of an AFM tip can be less than or equal to about 1 μm, such as from about 5 nanometer ("nm") to about 900 nm, from about 5 nm to about 200 nm, from about 5 nm to about 100 nm, from about 5 nm to about 50 nm, or from about 5 nm to about 20 nm.

An AFM probe can be brought in contact with a cell membrane so as to apply a force in the range of about 1 pico-Newton ("pN") to about 1 micro-Newton ("μN"), such as from about 10 pN to about 100 nano-Newton ("nN") or from about 100 pN to about 10 nN. With a contact area on the cell membrane of a radius less than or equal to about 1 μm, an associated pressure applied to the cell membrane can be in the range of about 500 Pascal ("Pa") up to about 6 kilo-Pascal ("kPa") or more. A resulting extent of movement of the cell membrane can be in the range of about 0.1 nm to about 500 nm, such as from about 1 nm to about 400 nm, from about 1 nm to about 300 nm, from about 1 nm to about 200 nm, or from about 1 nm to about 100 nm. Movement of the cell membrane can be detected with a single measurement or multiple measurements, which can occur at regular time intervals or irregular time intervals. For example, multiple measurements can occur at a frequency in the range of about 0.1 Hertz ("Hz") to about 10 kilo-Hertz ("kHz"), such as from about 1 Hz to about 1 kHz, from about 1 Hz to about 100 Hz, or from about 1 Hz to about 10 Hz.

Attention turns to FIG. 1, which illustrates a nanomechanical analysis system 10 implemented in accordance with an embodiment of the invention. The system 10 includes a set of components corresponding to an AFM, which is used to determine a nanomechanical characteristic of an ex vivo human cell 14 by way of a probing element. The cell 14 is placed within a fluid medium 40, which can be any cell culture medium such as D-MEM/F-12, and is supported by a substrate 30. For reasons that are further described below, the substrate 30 is desirably formed of an optically transparent or translucent material, such as glass or plastic.

As illustrated in FIG. 1, the system 10 includes a cantilever 18 having one end 52 that is connected to a cantilever body 24, which is connected to a cantilever support 28. The cantilever support 28, in turn, is connected to an expansion element 26, such as a piezo-electric element, which is actuated to expand or contract so as to move the cantilever support 28 and other connected components vertically along the z-axis. Another end 38 of the cantilever 18 is adjacent to a probe 20 including a tip 22. The probe 20 is elongated and extends from a lower surface of the cantilever 18 in a direction substantially along the z-axis.

During operation of the system 10, the cantilever support 28 is moved downwardly as a result of actuating the expansion element 26. Eventually, the tip 22 of the probe 20 is brought in contact with the cell 14, and applies a force to the cell 14. As the expansion element 26 is expanded further, the force applied through the tip 22 increases and results in deformation of the cell 14. The cantilever 18 is flexible and has a relatively weak spring constant, and an elastic response from the cell 14 resists the applied force and results in deflection of the cantilever 18 by a certain angle α relative to a horizontal plane.

In the illustrated embodiment, the extent of deflection of the cantilever 18 is detected using a light source 32 and a photo-detector element 36. Referring to FIG. 1, the light source 32 is implemented as a laser, which emits a light beam 34 that is brought to focus on an upper surface of the cantilever 18. The light beam 34 is reflected towards and strikes the photo-detector element 36 as a laser spot. Deflection of the cantilever 18 moves the position of the laser spot with respect to the photo-detector element 36. As illustrated in FIG. 1, the photo-detector element 36 is implemented as an array of photo-detectors within four quadrants, and the photo-detectors produce outputs in response to the extent or presence of the laser spot within those quadrants. A difference in outputs between two or more quadrants indicates the position of the laser spot with respect to the photo-detector element 36 and, thus, the extent of deflection of the cantilever 18. Other mechanisms for detecting the deflection of the cantilever 18 are also contemplated. For example, bending of the cantilever 18 can be detected using an interference-detector element, which detects the extent of interference between a reflected light beam and an original light beam. As another example, a piezo-resistive element or a piezo-electric element can be included within or connected to the cantilever 18 so as to detect the extent of bending of the cantilever 18.

As illustrated in FIG. 1, the system 10 also includes a controller and data processor 42, which is connected to various components of the system 10 and serves to direct operation of those components. The controller and data processor 42 also processes outputs produced by the photo-detector element 36, and performs various data retrieval and manipulation operations for the purpose of diagnosis or monitoring of biological states. Referring to FIG. 1, the controller and data processor 42 is connected to a display element 50, which produces visual indications for a user of the system 10. The controller and data processor 42 is also connected to a memory 44, which stores computer code or executable instructions for performing various data retrieval and manipulation operations. The memory 44 also organizes data associated with diagnosis or monitoring of biological states, such as within a database.

Still referring to FIG. 1, the system 10 further includes a light source 46 and an optical microscope 48, which is connected to the light source 46. The light source 46 illuminates the cell 14 from above, and the optical microscope 48 is implemented in an inverted configuration adjacent to a lower surface of the optically transparent or translucent substrate 30. Advantageously, the optical microscope 48 allows visual examination of the cell 14 through the substrate 30, and allows lateral positioning of the tip 22 over a central or nuclear region of the cell 14 with a desired level of precision. The optical microscope 48 also allows AFM analysis to be performed in conjunction with visual examination of the cell 14, such as for the purpose of locating and selecting the cell 14 for AFM analysis based on its morphological characteristics or its interaction with fluorescent labels.

While the single cell 14 is illustrated in FIG. 1, it is contemplated that multiple cells can be supported by the substrate 30 and can be subjected to similar analysis as described for the cell 14. In some instances, multiple ex vivo human cells are prepared by subjecting a biological sample to a cytospin procedure, where a healthy or disease state of the cells in the biological sample is to be determined. In such instances, a cell-counting device, such as a Coulter Counter (Beckman Coulter, San Diego, Calif.), can be used to ensure that a sufficient number of cells are obtained in accordance with the cytospin procedure. Typically, 10 to 20 living cells are desirable for AFM analysis, and the cells can be spread on the substrate 30 in a monolayer fashion. By using a cell-counting device, a volume of a biological sample to be subjected to the cytospin procedure can be determined in accordance with the formula:

$$\text{Volume} = (\text{number of cells desired})/(\text{density of cells per unit volume}) \quad (I)$$

Figure 2A:
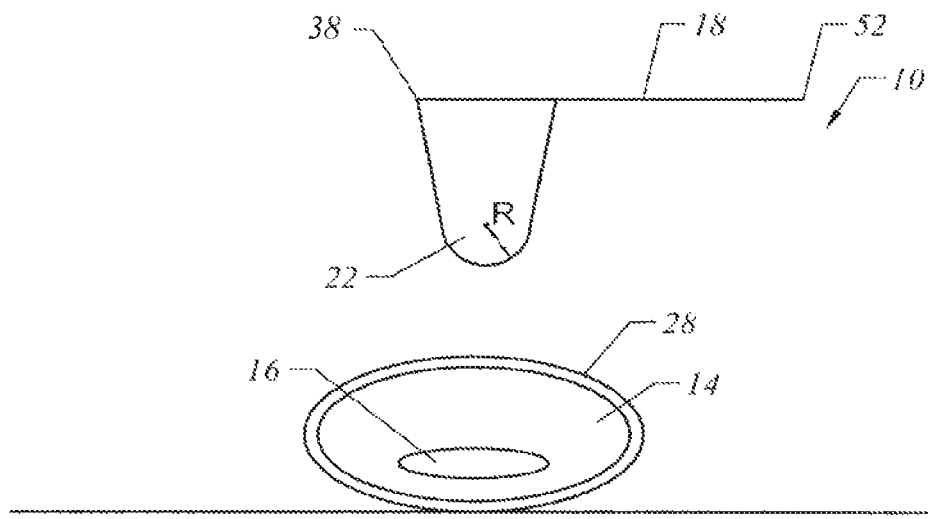
FIG. 2A and FIG. 2B illustrate operation of the system of FIG. 1, according to an embodiment of the invention.
Figure 2B:
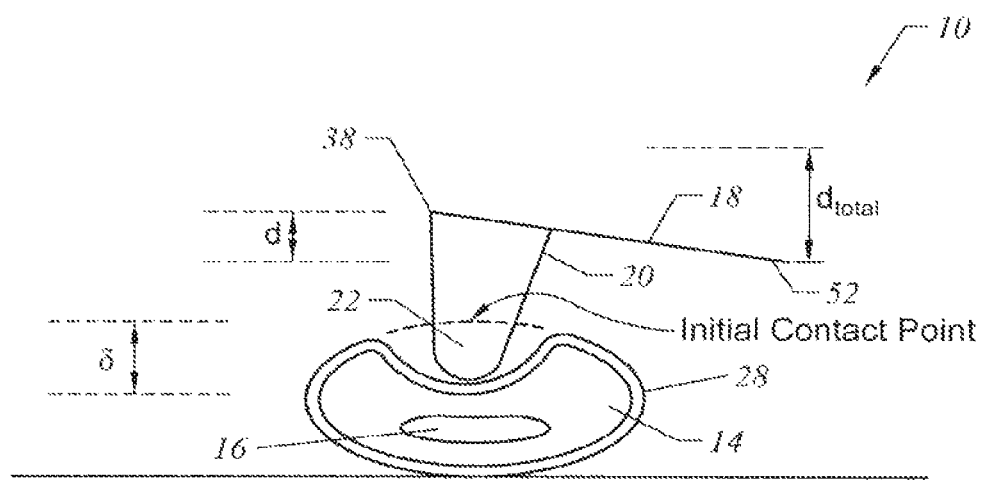

The operation of the system 10 can be further understood with reference to FIG. 2A and FIG. 2B. In particular, FIG. 2A illustrates the system 10 in a first configuration with the probe 20 positioned at a certain distance above the cell 14, while FIG. 2B illustrates the system 10 in a second configuration with the probe 20 in contact with the cell 14 and positioned over a nucleus 16 of the cell 14.

In the illustrated embodiment, the tip 22 of the probe 20 has a shape that is substantially a circular paraboloid, and, in the second configuration, the tip 22 has applied sufficient pressure to result in elastic deformation of a cell membrane 28. The Young's modulus E of the cell 14 can be calculated in accordance with the formula:

$$E = k(d) 9/16 R^{-1/2} \delta^{-3/2} \quad (II)$$

where k is the spring constant of the cantilever 18, d is a deflection distance of the cantilever end 38, R is a radius of the tip 22, and δ is a deformation depth of the cell membrane 28. The deformation depth δ can be calculated in accordance with the formula:

$$\delta = d_{total} - d \quad (III)$$

where $d_{total}$ is a distance that the cantilever end 52 has moved between the two configurations as a result of expansion of the expansion element 26 of FIG. 1. While the illustrated embodiment has been described with reference to a paraboloid tip shape, it is contemplated that the tip 22 can have various other shapes, and that the Young's modulus E can be similarly calculated for those shapes. Examples of other tip shapes include spherical shapes (e.g., associated with tips formed by connecting spheres to cantilevers), conical shapes, shapes associated with substantially flat or blunt tips, and shapes associated with tips that are curved or oblong (but not paraboloid).

Nanomechanical Characteristics of Ex Vivo Cells

Figure 3:
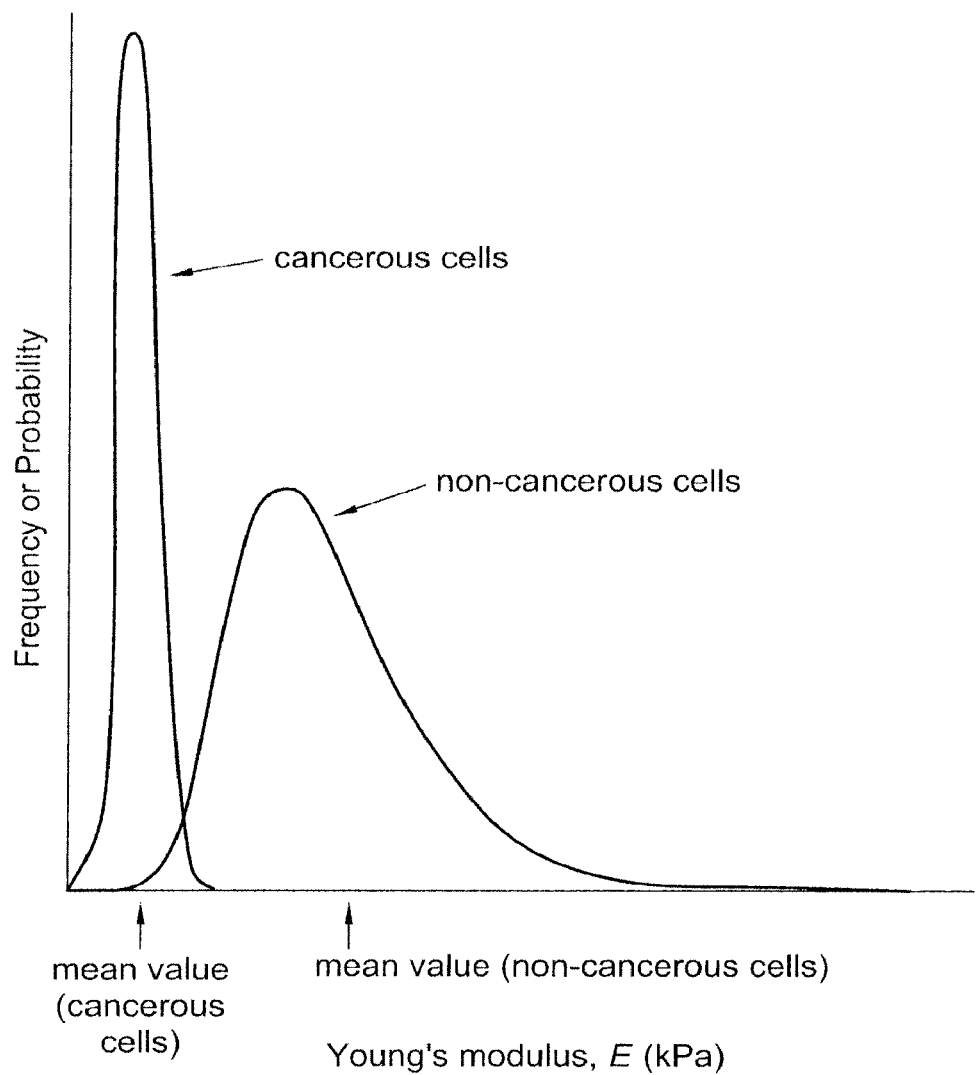
FIG. 3 illustrates distributions of Young's modulus values for a population of non-cancerous ex vivo human cells and a population of cancerous ex vivo human cells characterized according to an embodiment of the invention.

Attention next turns to FIG. 3, which illustrates distributions of Young's modulus values for a population of non-cancerous ex vivo human cells and a population of cancerous ex vivo human cells characterized according to an embodiment of the invention. Since the ex vivo cells are substantially unmodified with respect to their natural conditions, the distributions illustrated in FIG. 3 are also applicable with reference to non-cancerous in vivo human cells and cancerous in vivo human cells.

Referring to FIG. 3, certain notable differences between the distributions can be observed. In particular, the distribution of Young's modulus values for non-cancerous human cells substantially corresponds to a log-normal distribution, while the distribution of Young's modulus values for cancerous human cells substantially corresponds to a Gaussian distribution. With respect to typical values of the distributions, a mean Young's modulus value and a peak Young's modulus value for non-cancerous human cells are greater than corresponding values for cancerous human cells, reflecting an increased elasticity or reduced stiffness of cancerous human cells relative to non-cancerous human cells as a result of malignant transformation. In the illustrated embodiment, the mean Young's modulus value for non-cancerous human cells can be greater than or equal to about 1.5 kPa, such as from about 1.5 kPa to about 2.5 kPa, from about 1.7 kPa to about 2.3 kPa, or from about 1.9 kPa to about 2.1 kPa. The mean Young's modulus value for cancerous human cells can vary depending on a stage of progression or aggressiveness of the cancerous cells, reflecting an increased elasticity or reduced stiffness of more advanced or aggressive cancerous human cells relative to less advanced or aggressive cancerous human cells. Metastatic cancer cells typically correspond to particularly advanced or aggressive cancerous cells, and, for the case of metastatic cancer cells in the illustrated embodiment, the mean Young's modulus value can be less than or equal to about 1 kPa, such as from about 0 kPa to about 1 kPa, from about 0.2 kPa to about 0.8 kPa, or from about 0.4 kPa to about 0.6 kPa. As such, the mean Young's modulus value of metastatic cancer cells can be smaller than the corresponding value for non-cancerous human cells by a factor of at least about 2, such as at least about 3 times smaller or at least about 4 times smaller. For the case of cancerous cells of intermediate advancement or aggressiveness, the mean Young's modulus value can be in the range of about 0.5 kPa to about 1.5 kPa, such as from about 0.7 kPa to about 1.3 kPa or from about 0.9 kPa to about 1.1 kPa. For the case of cancerous cells of lesser advancement or aggressiveness, the mean Young's modulus value can be in the range of about 1 kPa to about 2 kPa, such as from about 1.2 kPa to about 1.8 kPa or from about 1.4 kPa to about 1.6 kPa.

Still referring to FIG. 3, a spread in the distribution of Young's modulus values for non-cancerous human cells is greater than a corresponding spread of Young's modulus values for cancerous human cells, reflecting a reduced variability in elasticity or stiffness values for cancerous human cells relative to non-cancerous human cells as a result of malignant transformation. In the illustrated embodiment, about 95 percent of Young's modulus values for non-cancerous human cells can be in the range of about 0.9 kPa to about 4 kPa, and a standard deviation of those values can be in the range of about 0.5 kPa to about 1.5 kPa, such as from about 0.5 kPa to about 1 kPa or from about 0.6 kPa to about 0.9 kPa. For the case of metastatic cancer cells in the illustrated embodiment, about 95 percent of Young's modulus values can be in the range of about 0.2 kPa to about 0.95 kPa, and a standard deviation of those values can be in the range of about 0.05 kPa to about 0.3 kPa, such as from about 0.05 kPa to about 0.2 kPa or from about 0.05 kPa to about 0.15 kPa. As such, the standard deviation of Young's modulus values for metastatic cancer cells can be smaller than the corresponding standard deviation for non-cancerous human cells by a factor of at least about 4, such as at least about 5 times smaller or at least about 6 times smaller, and the distributions of Young's modulus values for metastatic cancer cells and non-cancerous human cells can overlap to a limited extent, such as to an extent equal to or less than about 5 percent. A spread in the distribution of Young's modulus values for cancerous human cells of intermediate or lesser advancement can be similar to the corresponding spread of Young's modulus values for metastatic cancer cells.

Figure 4:
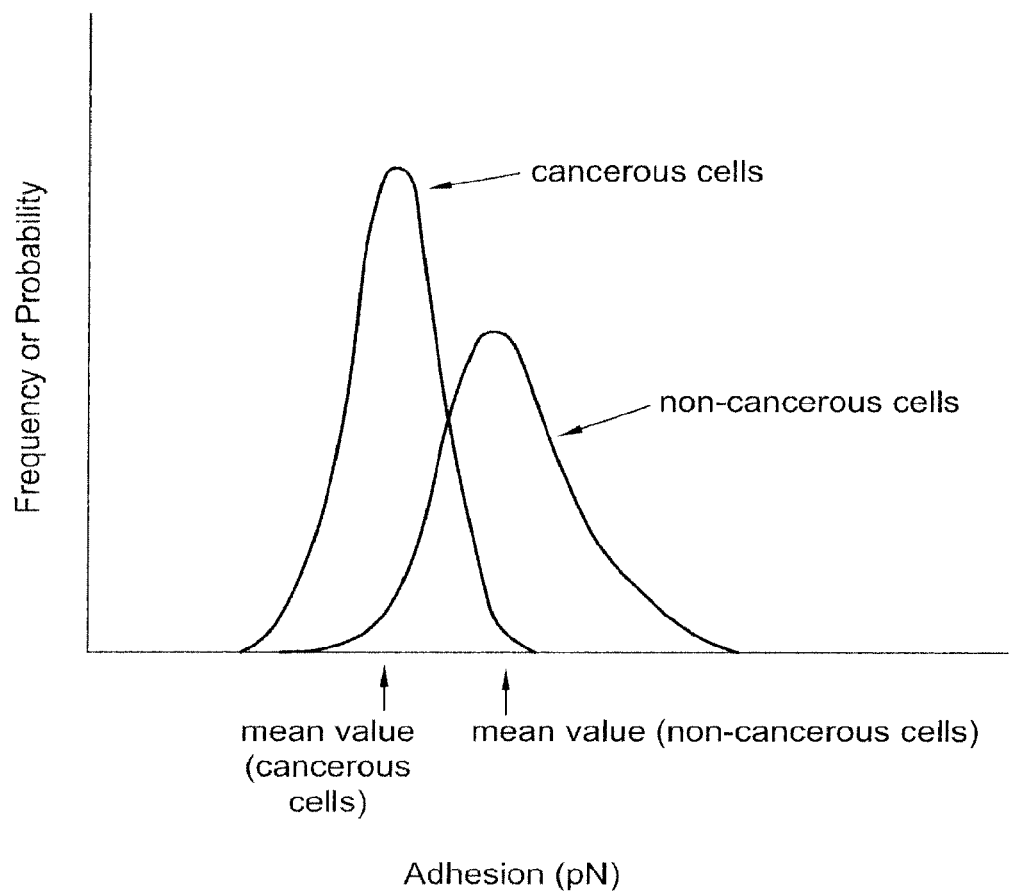
FIG. 4 illustrates distributions of adhesiveness values (in terms of detachment forces) for a population of non-cancerous ex vivo human cells and a population of cancerous ex vivo human cells characterized according to an embodiment of the invention.

FIG. 4 illustrates distributions of adhesiveness values (in terms of detachment forces) for a population of non-cancerous ex vivo human cells and a population of cancerous ex vivo human cells characterized according to an embodiment of the invention. Since the ex vivo cells are substantially unmodified with respect to their natural conditions, the distributions illustrated in FIG. 4 are also applicable with reference to non-cancerous in vivo human cells and cancerous in vivo human cells.

Referring to FIG. 4, the distribution of adhesiveness values for non-cancerous human cells substantially corresponds to a Gaussian distribution, and the distribution of adhesiveness values for cancerous human cells also substantially corresponds to a Gaussian distribution. However, with respect to typical values of the distributions, a mean adhesiveness value for non-cancerous human cells is greater than a corresponding value for cancerous human cells, reflecting a reduced adhesiveness of cancerous human cells relative to non-cancerous human cells as a result of malignant transformation. In the illustrated embodiment, the mean adhesiveness value for non-cancerous human cells can be greater than or equal to about 40 pN, such as from about 40 pN to about 60 pN, from about 45 pN to about 55 pN, or from about 48 pN to about 52 pN. The mean adhesiveness value for cancerous human cells can vary depending on a stage of progression or aggressiveness of the cancerous cells, reflecting a reduced adhesiveness of more advanced or aggressive cancerous human cells relative to less advanced or aggressive cancerous human cells. For the case of metastatic cancer cells in the illustrated embodiment, the mean adhesiveness value can be less than about 40 pN, such as from about 25 pN to about 39 pN, from about 30 pN to about 39 pN, or from about 33 pN to about 37 pN. As such, the mean Young's modulus value of metastatic cancer cells can be smaller than the corresponding value for non-cancerous human cells by a factor of at least about 1.2, such as at least about 1.3 times smaller or at least about 1.4 times smaller. For the case of cancerous cells of intermediate advancement or aggressiveness, the mean adhesiveness value can be in the range of about 30 pN to about 50 pN, such as from about 35 pN to about 45 pN or from about 38 pN to about 42 pN. For the case of cancerous cells of lesser advancement or aggressiveness, the mean adhesiveness value can be in the range of about 35 pN to about 55 pN, such as from about 40 pN to about 50 pN or from about 43 pN to about 47 pN.

Still referring to FIG. 4, a spread in the distribution of adhesiveness values for non-cancerous human cells is greater than a corresponding spread of adhesiveness values for cancerous human cells, reflecting a reduced variability in adhesiveness values for cancerous human cells relative to non-cancerous human cells as a result of malignant transformation. In the illustrated embodiment, about 95 percent of adhesiveness values for non-cancerous human cells can be in the range of about 25 pN to about 60 pN, and a standard deviation of those values can be in the range of about 8 pN to about 20 pN, such as from about 10 pN to about 18 pN or from about 13 pN to about 18 pN. For the case of metastatic cancer cells in the illustrated embodiment, about 95 percent of adhesiveness values can be in the range of about 20 pN to about 45 pN, and a standard deviation of those values can be in the range of about 2 pN to about 10 pN, such as from about 2 pN to about 8 pN or from about 4 pN to about 6 pN. As such, the standard deviation of adhesiveness values for metastatic cancer cells can be smaller than the corresponding standard deviation for non-cancerous human cells by a factor of at least about 1.5, such as at least about 2 times smaller or at least about 3 times smaller. A spread in the distribution of adhesiveness values for cancerous human cells of intermediate or lesser advancement can be similar to the corresponding spread of adhesiveness values for metastatic cancer cells.

Diagnosis, Prediction, and Monitoring of Biological States Based on Nanomechanical Characteristics of Ex Vivo Cells Referring to FIG. 3 and FIG. 4, the distributions of Young's modulus values and adhesiveness values for non-cancerous human cells and cancerous human cells can form the basis of nanomechanical assays for cancer. In particular, the distributions illustrated in FIG. 3 and FIG. 4 can serve as reference values to which test values determined for ex vivo human cells in clinical samples can be compared for diagnosis, prediction, and monitoring of cancer in human patients.

Advantageously, nanomechanical assays can be performed on a variety of clinical samples for diagnosis, prediction, and monitoring of different types of cancer. For example, nanomechanical assays can be performed on body cavity fluids for diagnosis, prediction, and monitoring of metastatic adenocarcinoma. As another example, nanomechanical assays can be performed on urinary fluids for diagnosis, prediction, and monitoring of bladder cancer. As a further example, nanomechanical assays can be performed on primary tumor samples for diagnosis, prediction, and monitoring of breast cancer. Nanomechanical assays can be performed in conjunction with visual examination of ex vivo human cells, such as in accordance with morphological examination or immunofluorescence labeling of the cells. Such visual examination can facilitate locating and selecting a subset of cells for nanomechanical assays based on morphological characteristics or interaction of the subset of cells with fluorescent labels.

According to an embodiment of the invention, a nanomechanical assay can be implemented for diagnosis of cancer and, in particular, as a diagnostic screen or test for the presence of cancer in a human patient. The nanomechanical assay can also be implemented as a prognostic screen or test for predicting the likelihood of developing cancer. In particular, a clinical sample can be collected from the human patient, and AFM analysis can be performed to determine test values of a set of nanomechanical characteristics of an ex vivo human cell in the clinical sample. The set of nanomechanical characteristics can include either of, or both, the Young's modulus and adhesiveness of the cell. For example, measurements can be performed using the system 10 of FIG. 1 to determine a set of Young's modulus values for the cell or a set of adhesiveness values for the cell. Multiple test values of each nanomechanical characteristic can be determined for the cell, and these multiple test values can be subjected to statistical analysis to determine an effective or typical test value for the cell. Also, multiple ex vivo human cells in the clinical sample can be subjected to AFM analysis to determine respective test values of the set of nanomechanical characteristics. For example, measurements can be performed using the system 10 of FIG. 1 to determine a set of Young's modulus values for each cell of a selected subset of cells or a set of adhesiveness values for each cell of the selected subset of cells. Multiple test values across different cells in the clinical sample can be subjected to statistical analysis to determine an effective or typical test value for the cells.

Next, test values of the set of nanomechanical characteristics resulting from AFM analysis can be compared with reference values of the set of nanomechanical characteristics. In particular, a comparison can be performed with respect to either of, or both, reference values for non-cancerous cells and reference values for cancerous cells, and results of the comparison can be indicative of whether the test values resulting from AFM analysis are substantially consistent with or substantially correspond to reference values for non-cancerous cells or cancerous cells. It will be appreciated that a determination of consistency or correspondence with one type of cell can reflect inconsistency or lack of correspondence with another type of cell, and vice versa. In such manner, the absence or presence of cancer in the human patient can be reliably diagnosed, or the likelihood of developing cancer can be reliably predicted. Advantageously, reliable diagnosis or prediction of cancer has the potential to alert a health care provider to early onset of cancer in the human patient, which can lead to early treatment and significantly improved recovery and survival rates.

For example, using the system 10 of FIG. 1, a set of Young's modulus values for an ex vivo human cell can be compared with reference values as illustrated in FIG. 3. If the set of Young's modulus values fall within a typical range of reference values for cancerous cells (e.g., accounting for 95 percent of the reference values) and outside a typical range of reference values for non-cancerous cells, a determination can be made that the cell is likely cancerous or is likely progressing towards developing cancer. Conversely, if the set of Young's modulus values fall within the typical range of reference values for non-cancerous cells and outside the typical range of reference values for cancerous cells, a determination can be made that the cell is likely non-cancerous or benign. If the set of Young's modulus values fall within an overlapping range for non-cancerous cells and cancerous cells, an inconclusive determination can be made, and analysis of additional cells in the clinical sample can be performed. As an alternative to, or in conjunction with, the manner of comparison described above, the set of Young's modulus values can be compared with typical reference values as illustrated in FIG. 3. In particular, a determination can be made whether the cell is likely cancerous or non-cancerous based on proximity of the set of Young's modulus values to a typical reference value for cancerous cells (e.g., a mean reference value) or proximity of the set of Young's modulus values to a typical reference value for non-cancerous cells. A similar manner of comparison can be performed using an effective or typical test value for a single cell or an effective or typical test value across different cells in the clinical sample. Moreover, a similar manner of comparison can be performed using adhesiveness values resulting from AFM analysis and reference values as illustrated in FIG. 4.

For certain applications, multiple test values across different cells in the clinical sample can be subjected to statistical analysis to determine the nature or extent of a distribution of those test values, and results of the statistical analysis can be compared with reference distributions as illustrated in FIG. 3 and FIG. 4. For example, if Young's modulus values of the cells can be substantially fitted to a Gaussian distribution (e.g., a reference Gaussian distribution as illustrated in FIG. 3), a determination can be made that the cells are likely cancerous or are likely progressing towards developing cancer. Conversely, if the Young's modulus values can be substantially fitted to a log-normal distribution (e.g., a reference log-normal distribution as illustrated in FIG. 3), a determination can be made that the cells are likely non-cancerous or benign. If the Young's modulus values exhibit characteristics consistent with both a Gaussian distribution and a log-normal distribution, either an inconclusive determination can be made or a determination can be made that both types of cells are present in the clinical sample. As an alternative to, or in conjunction with, the manner of comparison described above, a spread in the Young's modulus values can be compared with spreads in reference values as illustrated in FIG. 3. In particular, a determination can be made whether the cells are likely cancerous or non-cancerous based on proximity of the spread in the Young's modulus values to a spread in reference values for cancerous cells (e.g., a standard deviation) or proximity of the spread in the Young's modulus values to a spread in reference values for non-cancerous cells. A similar manner of comparison can be performed using adhesiveness values resulting from AFM analysis and reference distributions as illustrated in FIG. 4.

In addition to detecting or predicting cancer, an embodiment of a nanomechanical assay can be implemented for diagnosis or prediction of a particular stage of progression of cancer in a human patient. In particular, a clinical sample can be collected from the human patient, and AFM analysis can be performed to determine test values of a set of nanomechanical characteristics in a similar manner as described above. Next, the test values of the set of nanomechanical characteristics resulting from AFM analysis can be compared with reference values of the set of nanomechanical characteristics. For certain applications, the detection of cancer in the clinical sample by itself can be indicative of a particular stage of cancer in the human patient. For example, body cavities are typically the site of metastasis, and the detection of cancer in body cavity fluids can be indicative of widespread cancer. For other applications, a comparison can be performed with respect to cancerous cells of different degrees of advancement or aggressiveness, and results of the comparison can be indicative of whether the test values resulting from AFM analysis are substantially consistent with or substantially correspond to reference values for cancerous cells of a particular degree of advancement. It will be appreciated that a determination of consistency or correspondence with cancerous cells of one degree of advancement can reflect inconsistency or lack of correspondence with cancerous cells of another degree of advancement, and vice versa. In such manner, a particular stage of cancer in the human patient can be reliably diagnosed, or the likelihood of further progression of cancer towards that stage can be reliably predicted.

For example, using the system 10 of FIG. 1, a set of Young's modulus values for an ex vivo human cell can be compared with reference values as illustrated in FIG. 3. If the set of Young's modulus values fall within a typical range of reference values for metastatic cancer cells and outside a typical range of reference values for non-cancerous cells or cancerous cells of intermediate or lesser advancement, a determination can be made that the cell is likely metastatic or is likely progressing towards metastasis. If the set of Young's modulus values fall within the typical range of reference values for cancerous cells of intermediate or lesser advancement and outside the typical range of reference values for non-cancerous cells or metastatic cancer cells, a determination can be made that the cell likely has or is developing cancer of intermediate or lesser advancement. If the set of Young's modulus values fall within an overlapping range of reference values, an inconclusive determination can be made, and analysis of additional cells in the clinical sample can be performed. As an alternative to, or in conjunction with, the manner of comparison described above, the set of Young's modulus values can be compared with typical reference values as illustrated in FIG. 3. In particular, a determination can be made of the degree of advancement of cancer in the cell based on proximity of the set of Young's modulus values to a typical reference value for metastatic cancer cells (e.g., a mean reference value) or proximity of the set of Young's modulus values to a typical reference value for non-cancerous cells or cancerous cells of intermediate or lesser advancement. A similar manner of comparison can be performed using an effective or typical test value for a single cell or an effective or typical test value across different cells in the clinical sample. Also, multiple test values across different cells in the clinical sample can be subjected to statistical analysis to determine the nature or extent of a distribution of those test values, and results of the statistical analysis can be compared with reference distributions for cancerous cells of different degrees of advancement or aggressiveness. Moreover, a similar manner of comparison can be performed using adhesiveness values resulting from AFM analysis and reference values as illustrated in FIG. 4.

By providing reliable diagnosis or prediction of a particular type of cancer in a human patient, an embodiment of a nanomechanical assay can be implemented for selection of a therapeutic agent suitable for that type of cancer. Also, by providing reliable diagnosis or prediction of a particular stage of cancer in the human patient, the nanomechanical assay can be implemented for selection of a therapeutic agent suitable for that stage of cancer. Examples of therapeutic agents that can be used to treat cancer include Green tea extract ("GTE") and various chemotherapy drugs such as cisplatin (or cis-diamminedichloridoplatinum(II)) and paclitaxel. It will be appreciated that certain therapeutic agents can be suitable for a particular type of cancer of one degree of advancement or aggressiveness, while other therapeutic agents can be suitable for the same or a different type of cancer of another degree of advancement. Suitability of a therapeutic agent can involve considerations related to its effectiveness in terms of impeding or reversing progression of cancer as well as considerations related to its potential side effects. For example, if test values resulting from AFM analysis are indicative of metastasis or progression towards metastasis, a therapeutic agent suitable for particularly advanced or aggressive cancer can be selected for the human patient. Conversely, if the test values resulting from AFM analysis are indicative of cancer of intermediate or lesser advancement, another therapeutic agent can be selected for the human patient. In such manner, treatment of the human patient can be tailored in accordance with a particular type and a particular stage of cancer in the human patient, which can significantly improve recovery and survival rates.

Once a therapeutic agent is selected for a human patient, an embodiment of a nanomechanical assay can be implemented for monitoring effectiveness of the therapeutic agent in terms of impeding or reversing progression of cancer in the human patient. In particular, the effectiveness of the therapeutic agent can be determined by administering the therapeutic agent to the human patient, collecting a clinical sample from the human patient subsequent to administering the therapeutic agent, and performing AFM analysis on the clinical sample in a similar manner as described above. The therapeutic agent can be administered in a variety of ways, such as orally, via inhalation, intravenously, or a combination thereof. Typically, an effective dose of the therapeutic agent is administered to the human patient, and the effective dose can be determined using a variety of pharmacological techniques.

Next, post-treatment test values of a set of nanomechanical characteristics can be compared with reference values of the set of nanomechanical characteristics. For certain applications, a comparison can be performed with respect to reference values as illustrated in FIG. 3 and FIG. 4, and results of the comparison can be indicative of whether the post-treatment test values are substantially consistent with or substantially correspond to reference values for non-cancerous cells or cancerous cells of a lesser degree of advancement. For other applications, baseline or pre-treatment test values of the set of nanomechanical characteristics can be determined by collecting a clinical sample from the human patient prior to administering the therapeutic agent, and performing AFM analysis on the clinical sample in a similar manner as described above. The pre-treatment test values can serve as reference values to which the post-treatment test values are compared. Results of the comparison can be indicative of whether the post-treatment test values are shifted towards the absence of cancer or towards cancer of a lesser degree of advancement.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Methodology for Sample Preparation, AFM Measurements, Immunofluorescence Labeling, and Statistical Analysis Cytological Sample Preparation (ex vivo culture): Body cavity fluid samples were collected and processed using a set of standard protocols for cytological analysis, including Papanicolaou stain, Gimsa stain, and cellblock preparation. An aliquot of each sample (10 ml) was centrifuged at about 500 g for about 10 min. Cell pellets were re-suspended with MEM-F 12 culture medium and incubated for about 12 hr at about 37° C. in 5 percent $CO_2$ and 95 percent air. The culture medium was changed just prior to AFM measurements to wash off any dead and untouched cells.

AFM Measurements: Studies were conducted using a modified system including a Nanoscope IV Bioscope (Veeco Digital Instruments) combined with an inverted optical microscope (Nikon eclipse TE200). This combination permitted lateral positioning of an AFM tip over a central or nuclear region of a cell with micrometer precision. A scan size for all measurements was set to about 0 nm to maintain a substantially constant position over the cell, and, using an AFM software, the tip was brought into contact with the central region of the cell. AFM measurements were collected at about 37° C. using sharpened silicon nitride cantilevers with experimentally determined spring constants of about $0.02$ N m$^{-1}$ and a tip radius of less than about 20 nm. Force-displacement curves were recorded at about 1 Hz for determination of Young's modulus, E. E was determined by converting the force-displacement curves into force-indentation curves and fitting with the Hertz model, which represents the indentation of an elastic object using a stiff conical indenter. A half opening angle of the AFM tip was about 36°, and a Poisson ratio of the cell was taken to be 0.5, as is typical for soft biological materials. To reduce damage to the cell surface and to reduce any substrate-induced effects, measurements were performed in force ranges resulting in shallow indentations of the cell (<400 nm or <500 nm).

Immunofluorescence Triple Labeling: Two types of triple labeling assays were performed, namely DNA/F-actin/Ber-EP4 and DNA/Calretinin/Ber-EP4. For both assays, cells were fixed first with 3.7 percent formaldehyde for about 30 min at room temperature, washed with 1× PBS three times, and then incubated with 1 percent BSA in PBS pH 7.4 for about 30 min. For DNA/F-actin/Ber-EP4 labeling, cells were first incubated with mouse anti-human Ber-EP4 (DAKO) at about 1:300 dilution for about 1 hr, followed by Cy3-conjugated AffiniPure goat anti-mouse IgG(H+L) (Jackson ImmunoResearch Lab) at about 1:200 dilution for about 30 min, and then with BODIPY FL phallacidin F-actin (Molecular Probes) at about 1:40 dilution for about 30 min. Subsequently, cells were incubated with about 1:10,000 DAPI for about 5 min. For DNA/Calretinin/Ber-EP4 labeling, cells were first incubated with mouse anti-human Ber-EP4 (DAKO) at about 1:300 dilution for about 1 hr, followed by Cy3-conjugated AffiniPure goat anti-mouse IgG (H+L) (Jackson ImmunoResearch Lab) at about 1:200 dilution for about 30 min. Cells were then further incubated with about 1:600 diluted rabbit anti-human Calretinin antibody (Zymed) for about 1 hr, with FITC-conjugated AffiniPure goat anti-rabbit IgG(H+L) (Jackson ImmunoResearch Lab) at about 1:50 dilution for about 30 min, and then followed by about 1:10,000 DAPI for about 5 min. All incubations were performed at room temperature, with three PBS washing steps in between. Cells were covered with a mounting medium for fluorescence microscopic examination (Zeiss). Images were taken using an Olympus BX-40 microscope with a 40× objective.

Statistical Analysis: Data were expressed as mean values±standard deviation, and statistical significance of differences in mean values was assessed using a two-sample independent Student's t-test at the 95 percent confidence level. Differences in mean values were expressed using exact P values.

Example 2

Elasticity of Metastatic Cancer Cells and Benign Reactive Mesothelial Cells (Ex Vivo Culture)

Using the methodology of Example 1, elasticity of pathologically defined human metastatic cancer cells and benign reactive mesothelial cells in human body cavity (pleural) fluid clinical samples was determined using an AFM. Analysis of body cavity fluid samples, rather than primary tumor samples, was selected because tumor cells in body fluids are typically all metastatic in nature and thus provide a clonal population of metastatic cells for analysis. Additionally, the co-existence of both benign cells and metastatic cancer cells in a single sample provides a native internal control.

Body cavities, including pleural, pericardial, and peritoneal cavities, are typically covered by serous membranes including a single row of flat mesothelial cells on the surface and an underlying sub-mesothelial layer, which covers a relatively large surface area in close contact with major organs of the body. Because of their continuity with the lymphatic system, body cavities are typically the site of metastasis, and metastatic malignant effusions can be indicative of widespread cancer. Current cancer cell detection typically relies on qualitative morphological examination of changes in cell shape resulting from biochemical alterations, such as cytoskeletal remodeling. However, morphological examination of cells collected from an effusion can be difficult to diagnose because of the reactivity of mesothelial cells in mimicking metastatic cancer cells morphologically, including featuring enlarged nuclei and increased nuclear and cytoplasmic ratios, among other cytomorphological features.

In connection with AFM measurements, samples were collected from patients with suspected metastatic adenocarcinoma. The samples were centrifuged, and cell pellets were re-suspended in a culture medium for about 12 hr, which was based on time-culture experiments to establish an optimum incubation time for cell-substrate adherence for nanomechanical analysis while reducing artifacts resulting from in vitro culture. The 12 hr incubation time also allowed differentiation of benign and malignant cells based on their ex vivo growth and morphological characteristics. That is, cancer cells typically displayed anchorage-independent growth patterns, such as rounding of cells, while benign mesothelial cells typically displayed a relatively large, flat morphology. In such manner, AFM analysis was readily performed separately on the two cell populations. For each sample, eight probable benign mesothelial cells ("normal") and eight probable malignant cells ("tumor") were selected from a culture dish for ex vivo AFM analysis. This selection of probable malignant cells was performed except in negative cases where only benign cells were present. The AFM analysis was performed in an alternate fashion to ensure similar conditions were applied for both cell populations, without prior knowledge of results of cytomorphological analysis. For each clinical sample, a new cantilever was used to avoid contribution of potential artifacts. Cytomorphological and immunohistochemical confirmatory analysis, AFM analysis, and immunofluorescence analyses were performed independently. The cytomorphological analysis was performed on its own population of cells, but the immunofluorescence and AFM analyses were performed on the same population of cells. However, all of the cell populations were obtained from the same pleural effusion sample. AFM measurements were performed at about 37° C. at a rate of about 1 Hz. Force-displacement curves were recorded on each cell to determine a relative elasticity or stiffness (Young's modulus, E) of the individual cell, yielding values of E for each cell type per sample. Table 1 below sets forth results of the analyses.

Figure 5:
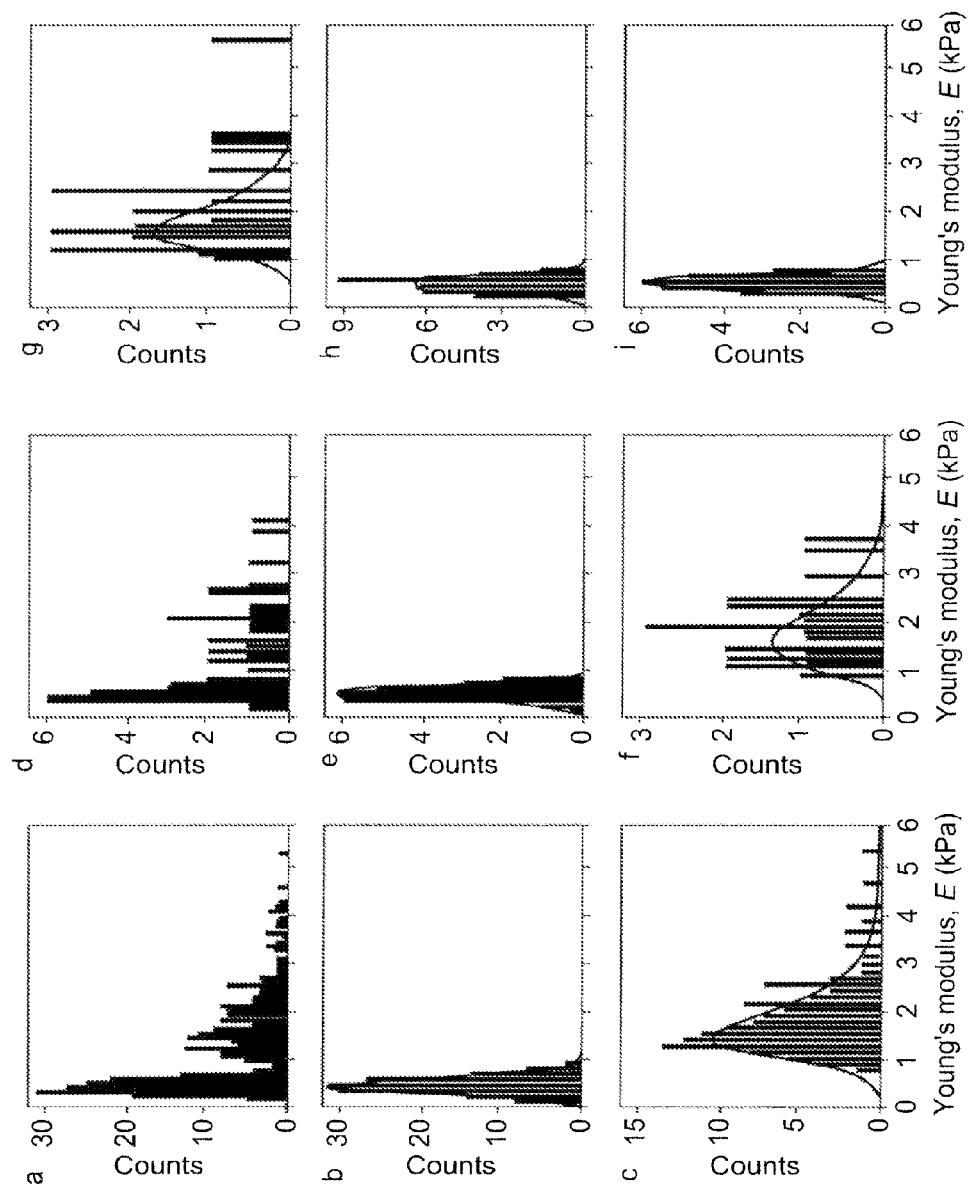
FIG. 5 illustrates results of cell elasticity measurements performed on clinical samples, according to an embodiment of the invention.

FIG. 5. Data collected from the seven clinical samples (positive for metastatic malignant cells, n=40; negative for malignant cells, n=48) yielded average E values (mean value±standard deviation) of about 0.53±0.10 kPa for all malignant cells and about 1.97±0.70 kPa for all benign mesothelial cells (see FIG. 5A through FIG. 5C). A two-sample independent t-test conducted for the malignant and benign cell populations showed that the population average values were significantly different from each other at the 95 percent confidence level ($P=8.72\times10^{-22}$). In addition, malignant cell elasticity measurements from a single clinical sample yielded an average cell elasticity (mean value±standard deviation) of about 0.56±0.09 kPa (see FIG. 5D and FIG. 5E) (Table 1, Sample No. 1). However, for this clinical sample, morphologically determined benign mesothelial cells exhibited a significantly increased average cell elasticity (mean value±standard deviation) of about 2.10±0.79 kPa (see FIG. 5D and FIG. 5F; $P=7.77\times10^{-5}$). Also of note, the malignant and benign mesothelial cells exhibited different trends, with elasticity measurements for the malignant cells and the benign mesothelial cells represented by Gaussian (normal) and log-normal fits, respectively. The malignant cells displayed a narrow, spiked peak with relatively little spread, while the benign mesothelial cells displayed a broad peak. Similarly, elasticity measurements collected on a single negative clinical sample yielded an average cell elasticity (mean value±standard deviation) of about 2.09±0.98 kPa (see FIG. 5G; n=8) (Table 1, Sample No. 7). The data indicate that metastatic cancer cells are

TABLE 1

| Sample No. | Age/Sex | Clinical History | Cytological Analysis | Elasticity (kPa) "Tumor" cells | Elasticity (kPa) "Normal" cells |
|---|---|---|---|---|---|
| 1 | 52/Female | Non-small cell carcinoma of the lung | Positive for metastatic malignant cells | 0.56 ± 0.09 | 2.10 ± 0.79 |
| 2 | 60/Female | Non-small cell carcinoma of the lung | Positive for metastatic malignant cells | 0.52 ± 0.12 | 2.05 ± 0.87 |
| 3 | 49/Female | Breast ductal adenocarcinoma | Positive for metastatic malignant cells | 0.50 ± 0.08 | 1.93 ± 0.50 |
| 4 | 85/Male | Pancreatic adenocarcinoma | Positive for metastatic malignant cells | 0.54 ± 0.08 | 0.54 ± 0.12 |
| 5 | 40/Male | Liver cirrhosis | Negative for malignant cells | N/A | 1.86 ± 0.50 |
| 6 | 47/Male | Fever and hepatic failure | Negative for malignant cells | N/A | 1.75 ± 0.61 |
| 7 | 92/Female | Anasarca peripheral oedema | Negative for malignant cells | N/A | 2.09 ± 0.98 |

To confirm that selected cell populations actually correspond to malignant and benign mesothelial cells, immunofluorescence triple labeling assays of the samples were performed. Labeling for DNA/Ber-EP4/F-actin and DNA/Ber-EP4/Calretinin both showed staining of small, round cells for Ber-EP4 (red), which is a biomarker for metastatic adenocarcinoma cells, thus confirming that the round or balled cells were indeed metastatic adenocarcinoma cells. Moreover, larger, flat cells were positive for Calretinin staining, which is indicative of normal mesothelial cells, thus confirming their optical morphology. Immunofluorescence analysis showed that the small, round cells were not apoptotic, dead, or mitotic, and had intact DNA.

Results of cell elasticity measurements (Young's modulus, E) performed on the clinical samples are illustrated in about 73±11 percent less stiff than benign mesothelial cells in the same clinical sample, and when compared to clinical samples collected from other patients. The observed similarity in the data from patient to patient and from cell to cell is indicative of a parallel across patient effusions and across cell types.

FIG. 5H and FIG. 5I illustrate Gaussian fits of elasticity data collected on an individual clinical sample (Table 1, Sample No. 4). Following ex vivo culture, there appeared to be two populations of cells: one cell population that was larger and more flat (suggestive of benign mesothelial cells); and the other cell population that was more rounded and balled (suggestive of malignant cells). Despite the difference in morphology in ex vivo culture, nanomechanical analysis concluded that the cells were all malignant cells. Average elasticity values (mean value±standard deviation) for the morphologically classified malignant cells and morphologically classified benign cells were 0.54±0.08 kPa and 0.54±0.12 kPa, respectively (see 5H and FIG. 5I; n=8). These population elasticity values were not statistically different, and indicated the presence of a single population of malignant cells. Subsequent immunohistochemical staining with a set of markers, including Calretinin, B72.3, and Ber-EP4, confirmed that the sample included one cell population, which was malignant based on immunohistochemical findings (negative for Calretinin and positive for Ber-EP4 and B72.3). Additionally, this particular case demonstrated the lack of correlation between ex vivo cultured cell morphology and measured elasticity, and that it is unlikely that the ex vivo cultured morphological differences influenced the measured elasticity.

By way of summary, the results indicate that a biologically driven shift towards a decrease in cell elasticity correlates with an increase in metastatic potential. Under similar conditions, elasticity of metastatic cancer cells is more than about 70 percent lower than that of normal reactive mesothelial cells in the same clinical sample, and when compared to other pleural effusions or other patients with different clinical histories (Table 1). Despite morphological overlap between malignant and benign cell types, which can impede cytomorphological and immunohistochemical diagnosis of malignant cells, nanomechanical analysis provided the ability to differentiate malignant cells, thereby allowing the detection of metastatic cancer cells in body fluids. Also, the distribution of measured cell elasticity for cancer cells was observed to fit a normal distribution and to be over five times narrower than the corresponding distribution for benign mesothelial cells, which was observed to fit a log-normal distribution.

Example 3

Elasticity of Metastatic Cancer Cells and Benign Reactive Mesothelial Cells (Cytospin Procedure Without Ex Vivo Culture)

To further confirm that measured differences in elasticity between cancer and benign cells were not an artifact of ex vitro culture, measurements were performed using a cytospin procedure without ex vivo culture, which yielded cell populations that were substantially indistinguishable in terms of morphology. By way of preview, the resulting elasticity values for cancer cells and benign mesothelial cells were similar to those obtained using a 12 hr ex vivo culture procedure. The results demonstrate that nanomechanical analysis is indicative of cell type, even when using different preparation procedures and different substrates.

The cytospin procedure was a modified version of that described in Motherby, H. et al., Pleural Carcinosis Confirmed by Adjuvant Cytological Methods: A Case Report, *Diag. Cytopathology* 19, 370-374 (1998), the disclosure of which is incorporated herein by reference in its entirety. In accordance with the cytospin procedure, cells were gently centrifuged on a slide (2 min at 500 g). The slide was then covered with a culture medium (90 percent D-MEM/F-12 (Ham) medium). AFM analysis was performed within about 2 hr of sample preparation to preserve cell viability. The speed and time of centrifugation were determined to allow initial cell-substrate adhesion with reduced alteration of nanomechanical characteristics of the cells. Without ex vivo culture, different cell types displayed substantially similar morphological characteristics. In particular, all cells, whether "tumor" or "normal," appeared rounded and were substantially indistinguishable by morphology alone. The following sets forth data from three clinical samples (2 positive samples):

"Tumor" (n=38 measurements):
  Young's modulus, E=0.50±0.26 kPa (mean value±standard deviation)
"Normal" (n=27 measurements):
  Young's modulus, E=2.73±1.30 kPa (mean value±standard deviation)

These average elasticity values are similar to those obtained using the 12 hr ex vivo culture procedure. The results indicate that nanomechanical analysis can be used to distinguish malignant cells from benign cells even when the cells have similar morphology.

Example 4

Elasticity of Metastatic Cancer Cells and Benign Reactive Mesothelial Cells (Ex Vivo Culture and Cytospin Procedure Without Ex Vivo Culture)

AFM analysis was performed using both the ex vivo culture procedure of Example 1 and a cytospin procedure without ex vivo culture. In accordance with the cytospin procedure, cells were gently centrifuged on a slide (1 min at 500 g), and the slide was then covered with a culture medium (90 percent D-MEM/F-12 (Ham) medium). AFM analysis was performed within about 1-2 hr of sample preparation to preserve cell viability. The speed and time of centrifugation were determined to allow initial cell-substrate adhesion with reduced alteration of nanomechanical characteristics of the cells. Without ex vivo culture, different cell types displayed substantially similar morphological characteristics. In particular, all cells, whether "tumor" or "normal," appeared rounded and were substantially indistinguishable by morphology alone. However, cancer cells typically display nuclear characteristics that differ slightly from that of benign cells, and this distinction provided a mechanism to select cell types.

Figure 6:
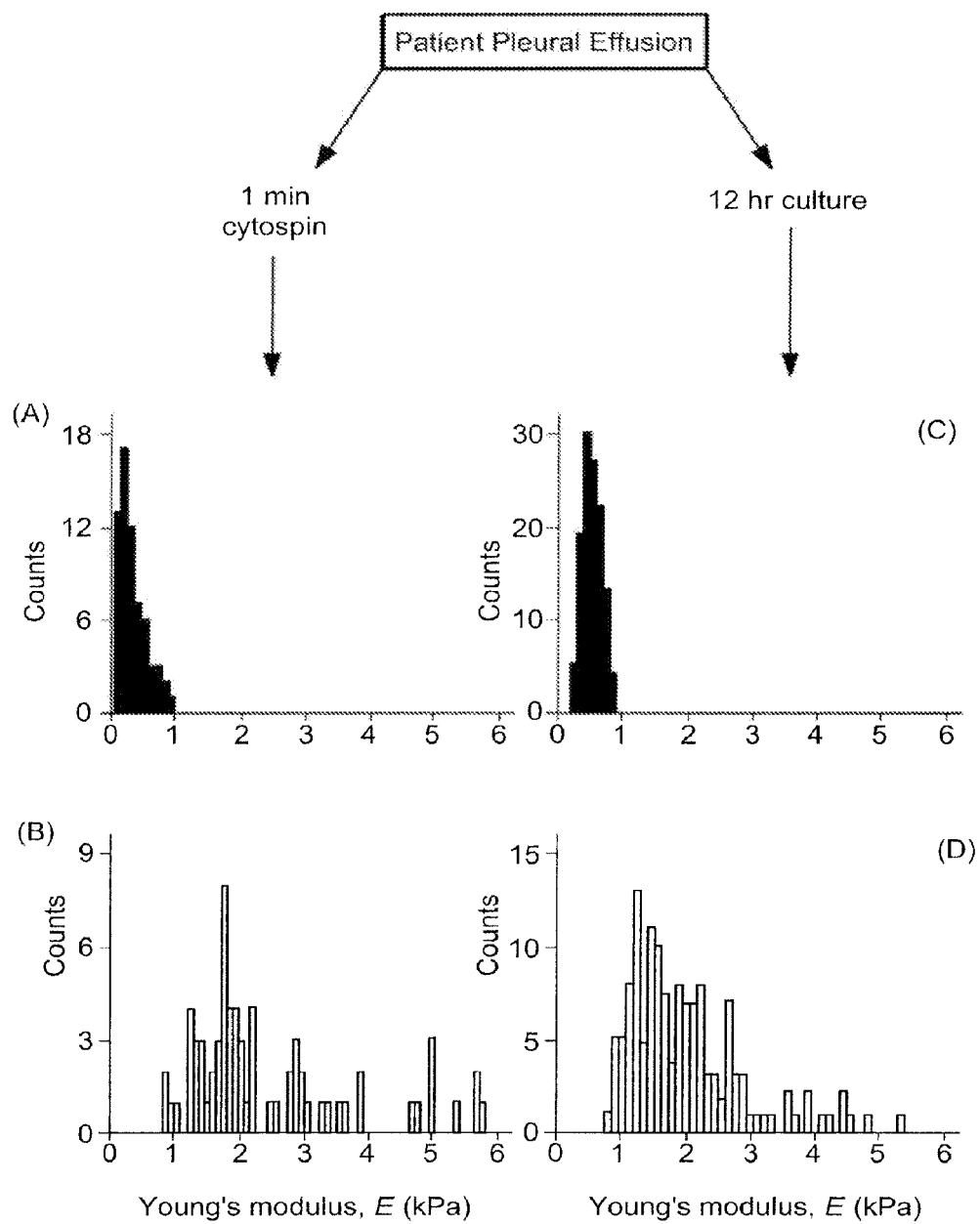
FIG. 6 illustrates measured cell elasticity values from cytospin-prepared clinical samples and samples prepared using an ex vivo culture procedure, according to an embodiment of the invention.

FIG. 6 illustrates measured cell elasticity values from cytospin-prepared clinical samples that were collected from patients with suspected metastatic adenocarcinoma. Analysis of all cytospin-prepared samples (metastatic cancer cells, n=64; benign reactive mesothelial cells, n=69) yielded average elasticity values (mean value±standard deviation) for all cancer and benign cells of about 0.38±0.20 kPa and 2.53±1.30 kPa, respectively (see FIG. 6A and FIG. 6B). A two sample independent t-test conducted for cancer and benign cell populations showed that the population values were significantly different from each another at the 95 percent confidence level (P=1.67×10$^{-25}$). Immunofluorescence triple labeling assays of the samples were performed using a combination of markers, including Calretinin (positive in benign mesothelial cells but negative for metastatic adenocarcinoma), BerEP4, and B72.3 (positive for metastatic adenocarcinoma but negative for benign mesothelial cells), to confirm that the selected cell populations corresponded to cancer cells and benign mesothelial cells. Immunofluorescence analysis also showed intact DNA, indicating that the cells were not dead, mitotic, or apoptotic.

FIG. 6 also illustrates measured cell elasticity values for cancer cells and benign mesothelial cells prepared using the ex vivo culture procedure (see FIG. 6C and FIG. 6D). The average cell elasticity values (mean value±standard deviation) obtained using the ex vivo culture procedure were 0.53±0.10 kPa and 1.97±0.70 kPa for cancer cells and benign cells, respectively (metastatic cancer cells, n=40; benign reactive mesothelial cells, n=48; P=8.72×10$^{22}$). The results indicate a substantial similarity in the measured elasticity values of different cell types, regardless of culture procedure. Also, the results indicate that elasticity of cancer cells is about 70 percent to about 80 percent less than that of benign cells, even when measured using a 1 min cytospin procedure that yields morphologically indistinguishable cell types. Advantageously, the cytospin procedure served to avoid lengthy culture times and to produce cells substantially similar to those under in vivo conditions, thus reducing any artifacts due to ex vivo culture conditions. Furthermore, nanomechanical analysis of cancer cells prepared using both the cytospin and the ex vivo culture procedures yielded a narrow distribution compared to benign mesothelial cells. Benign cells displayed a significantly larger spread in distribution of the measured cell elasticity values for both the cytospin and the ex vivo culture procedures. The results indicate that nanomechanical differences between cancer and benign cells, rather than different morphology resulting from ex vivo culture conditions, are the primary source of differences in measured cell elasticity between the cell types.

Example 5

Adhesiveness of Metastatic Cancer Cells and Benign Reactive Mesothelial Cells

Pleural effusion clinical samples were collected from patients with metastatic adenocarcinoma, and were prepared using a set of standard protocols as previously described in Example 1. The samples were placed in culture for about 12 hr. For each sample, probable benign cells ("normal") and probable malignant cells ("tumor") were selected from their culture for analysis using an AFM. The cells were selected based on their growth pattern in culture, as previously described. AFM analysis was conducted in an alternate fashion to ensure similar conditions for both the "tumor" cells and the "normal" cells, and without knowledge of results from cytomorphological analysis. Subsequently, the AFM analysis was confirmed by immunohistochemical staining for biomarkers using cellblock.

Figure 7:
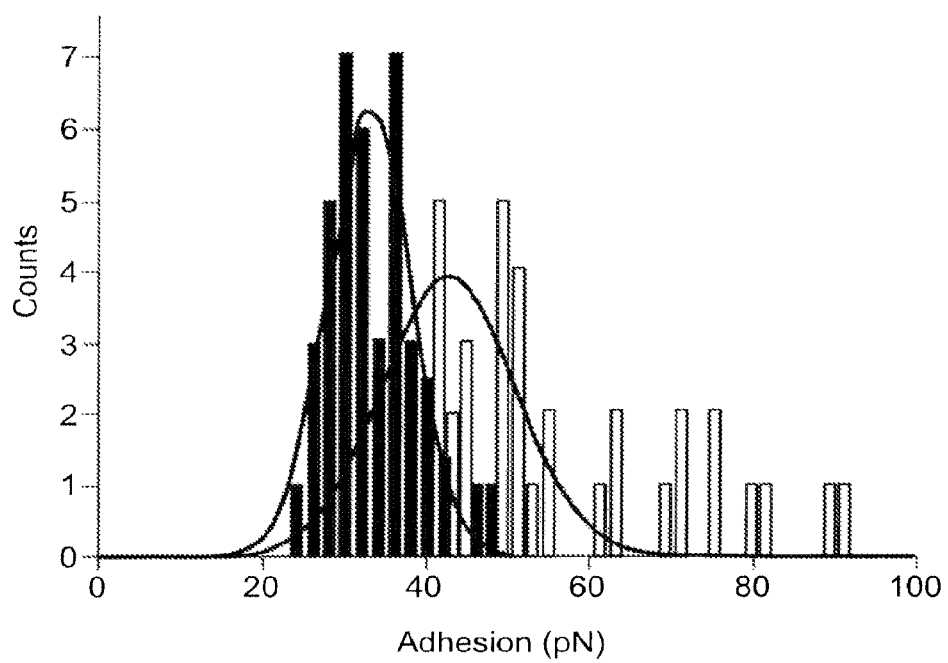
FIG. 7 illustrates results of Atomic Force Microscope analysis of cell surface adhesion for "tumor" cells and "normal" cells from pleural fluid samples, according to an embodiment of the invention.

Real-time, in vivo AFM measurements were performed on the clinical samples to determine cellular adhesive force as a function of nanomechanical characteristics of surface adhesive molecules. After positioning an AFM tip over a central region of a cell, the tip was brought into contact and pressed against a surface of the cell. During tip retraction from the cell surface, rupture events typically occurred, which indicate tip-cell surface adhesive interactions specific for each cell type. The results of the AFM analysis of the cell surface adhesion for "tumor" cells and "normal" cells from the pleural fluid samples are set forth in FIG. 7 and Table 2 below.

TABLE 2

| Sample No. | Adhesion (pN) "Tumor" cells | Adhesion (pN) "Normal" cells |
|---|---|---|
| 1 | 37.1 ± 4.0 | 60.7 ± 19.6 |
| 2 | 33.2 ± 3.8 | 45.1 ± 3.7 |
| 3 | 29.2 ± 1.9 | 51.2 ± 14.7 |
| 4 | 35.3 ± 3.7 | 36.0 ± 8.0 |
| 5 | N/A | 56.8 ± 18.5 |
| 6 | N/A | 41.7 ± 7.2 |
| 7 | N/A | 51.4 ± 16.0 |

The AFM analysis revealed average tip-cell surface adhesion or detachment forces of about 34.2±5.3 pN and about 51.1±15.2 pN for all "tumor" cells and "normal" mesothelial cells, respectively ("tumor" cells, n=40; "normal" cells, n=48) (see FIG. 7). A two sample independent t-test conducted on the two cell populations indicated that the population average values were significantly different from each other at the 95 percent confidence level (P=1.75×10$^{-9}$). The average number of observed tip-cell surface rupture (adhesion) events for all "tumor" cells and "normal" mesothelial cells was about 4.1±3.1 events and about 10.3±11.7 events, respectively (P=0.00168). When probed under similar conditions, the "normal" mesothelial cells exhibited an increased cell surface adhesion, namely about 33 percent more adhesive, and a larger spread in the associated distribution as compared to "tumor" cells in the same clinical sample. Moreover, force curves taken on a bare substrate (before and after those performed on cells) revealed little to no variation between approach and subsequent retraction curves, which would have been indicative of null adhesion.

Analysis of a clinical sample initially determined to include both malignant cells and benign mesothelial cells through cytomorphological examination yielded average tip-cell surface adhesion values of about 35.3±3.7 pN and about 36.0±8.0 pN for the morphologically classified "tumor" and "normal" populations, respectively (see Table 2, Sample No. 4). However, these results indicated the presence of a single population of malignant cells. Additional testing, including immunohistochemical staining for benign mesothelial cells (Calretinin) and malignant cells (B72.3 and Ber-Ep4), confirmed that the clinical sample included predominantly one malignant cell population, despite apparent morphological differences between cells in the same population. Thus, cell surface adhesion analysis provides an additional biomarker for cancer cell evaluation and serves as a diagnostic aid in assaying human pleural effusions and other cytological samples.

Example 6

Elasticity of Cells from Primary Breast Tumor Samples

Using a methodology similar to that of Example 1, elasticity of pathologically defined human cancer cells and benign cells in primary tumor clinical samples was determined using an AFM. The samples were collected from three different patients with suspected breast cancer. Table 3 below sets forth results of the AFM analysis. The results indicate a similar trend as observed for pleural effusion clinical samples, namely that cancer cells (here, primary tumor cancer cells) are less stiff than benign cells.

TABLE 3

| Sample No. | Classification | Elasticity (kPa) |
|---|---|---|
| 1 | Tumor | 0.70 ± 0.19 |
| 2 | Tumor | 0.68 ± 0.28 |
| 3 | Normal | 1.84 ± 0.54 |

Example 7

Effect of Therapeutic Agents on Cell Elasticity

Figure 8:
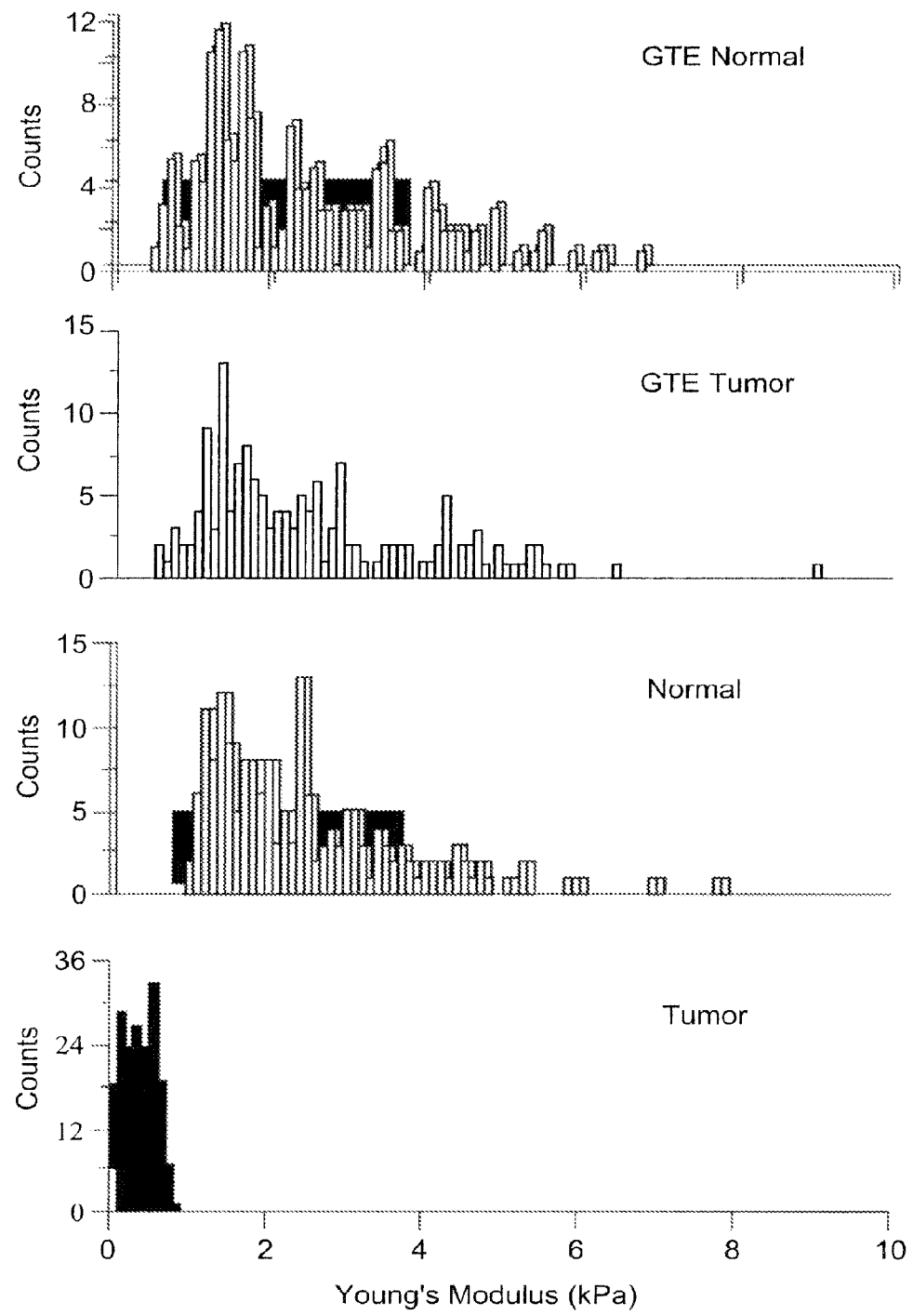
FIG. 8 illustrates results of Atomic Force Microscope analysis for "tumor" cells and "normal" cells with and without exposure to Green tea extract, according to an embodiment of the invention.

Using a methodology similar to that of Example 1, AFM measurements were performed to determine the effect of GTE on elasticity of cells obtained from body cavity fluid samples. The samples included 4 samples collected from patients with ovarian cancer, 3 samples collected from patients with lung cancer, 2 samples collected from patients with breast cancer, and 1 sample collected from a healthy individual. Probable benign cells ("normal") and probable malignant cells ("tumor") were selected from the samples for AFM analysis. The results of the AFM analysis for "tumor" cells and "normal" cells with and without exposure to GTE are illustrated in FIG. 8. The results indicate that exposure of malignant cells to GTE yields an increase in cell elasticity, and indicate that AFM measurements can provide a biomarker for therapeutic agent evaluation.

A practitioner of ordinary skill in the art requires no additional explanation in developing the embodiments described herein but may nevertheless find some helpful guidance regarding the determination of elasticity values using an AFM by examining the following references: Touhami, A. et al., Nanoscale Mapping of the Elasticity of Microbial Cells by Atomic Force Microscopy, *Langmuir* 19, 4539-4543 (2003); Rotsch, C. et al., Drug-induced Changes of Cytoskeletal Structure and Mechanics in Fibroblasts: An Atomic Force Microscopy Study, *Biophys. J.* 78, 520-535 (2000); Almqvist, N. et al., Elasticity and Adhesion Force Mapping Reveals Real-time Clustering of Growth Factor Receptors and Associated Changes in Local Cellular Rheological Properties, *Biophys J.,* 86(3), 1753-62 (2004); Rotsch, C. et al., AFM Imaging and Elasticity Measurements on Living Rat Liver Macrophages, *Cell Biology International,* 21(11), 685-96 (1997); and Matzke, R. et al., Direct, High-resolution Measurement of Furrow Stiffening During Division of Adherent Cells, *Nature Cell Biol.* 3, 607-610 (2001); the disclosures of which are incorporated herein by reference in their entireties. A practitioner of ordinary skill in the art may also find some helpful guidance regarding the determination of adhesiveness values using an AFM by examining the following references: van der Aa, B. et al., Stretching Cell Surface Macromolecules by Atomic Force Microscopy, *Langmuir,* 17(11), 3116-19 (2001); Cross, S. et al., Nanomechanical Properties of Glucans and Associated Cell Surface Adhesion of *Streptococcus Mutans* Probed by Atomic Force Microscopy Under In Situ Conditions, *Microbiology,* 153(9), 3124-32 (2007); Pelling, A. et al., Nanoscale Visualization and Characterization of *Myxococcus Xanthus* Cells with Atomic Force Microscopy, *Proc. Natl. Acad. Sci. USA,* 102(18), 6484-89 (2005); Rief, M. et al., Reversible Unfolding of Individual Titin Immunoglobulin Domains by AFM, *Science,* 276(5315), 1109-12 (1997); and Sen, S. et al., Indentation and Adhesive Probing of a Cell Membrane with AFM: Model and Experiments, *Biophy. J.,* 89(5), 3203-13 (2005); the disclosures of which are incorporated herein by reference in their entireties.

Certain embodiments of the invention relate to a computer storage product with a computer-readable storage medium including data structures and computer code for performing a set of computer-implemented operations. The medium and computer code can be those specially designed and constructed for the purposes of embodiments of the invention, or they can be of the kind well known and available to those having ordinary skill in the computer software arts. Examples of computer-readable storage media include: magnetic media such as hard disks, floppy disks, and magnetic tape; optical media such as Compact Disc-Read Only Memories ("CD-ROMs") and holographic devices; magneto-optical media such as floptical disks; and hardware devices that are specially configured to store and execute computer code, such as Application-Specific Integrated Circuits ("ASICs"), Programmable Logic Devices ("PLDs"), Read Only Memory ("ROM") devices, and Random Access Memory ("RAM") devices. Examples of computer code include machine code, such as produced by a compiler, and files including higher-level code that are executed by a computer using an interpreter. For example, an embodiment of the invention can be implemented using Java, C++, or other object-oriented programming language and development tools. Additional examples of computer code include encrypted code and compressed code. Another embodiment of the invention can be implemented in hardwired circuitry in place of, or in combination with, computer code.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A nanomechanical analysis system, comprising:
an expansion element;
a cantilever having a first end and a second end, the first end of the cantilever being connected to the expansion element;
a probe disposed adjacent to the second end of the cantilever, the probe being elongated and extending from the cantilever towards an upper surface of a cell to be analyzed;
a detector element disposed adjacent to the second end of the cantilever;
an optical microscope disposed adjacent to a lower surface of the cell;
a data processor connected to the detector element; and
a memory connected to the data processor,
wherein the optical microscope is configured to provide visual examination of the cell to position the probe with respect to a central region of the cell,
wherein the expansion element is configured to move the first end of the cantilever, such that the probe applies a stimulus to the cell,
wherein the detector element is configured to produce an output indicative of an extent of deflection of the second end of the cantilever in accordance with a response of the cell to the stimulus,
wherein the memory stores executable instructions to direct the data processor to:
based on the output of the detector element, determine a set of test values for the cell, the set of test values being indicative of at least one of the cellular Young's modulus or adhesiveness of the cell with respect to the probe.

2. The system of claim 1, wherein the probe includes a tip that is configured to apply the stimulus to the cell, and the tip has a radius in the range of 5 nm to 900 nm.

3. The system of claim 1, wherein the executable instructions include executable instructions to direct the data processor to:
compare the set of test values with a set of reference values to determine a degree of correspondence between the set of test values and the set of reference values, the set of reference values being associated with at least one of a population of cancerous cells or a population of non-cancerous cells; and
based on the degree of correspondence, produce an indication of a biological state of the cell.

4. The system of claim 3, wherein the executable instructions include executable instructions to direct the data processor to:
compare the set of test values with a pre-determined range of reference values associated with at least one of the population of cancerous cells or the population of non-cancerous cells.

5. The system of claim 3, wherein the executable instructions include executable instructions to direct the data processor to:
determine a set of test characteristics associated with a distribution of the set of test values; and
compare the set of test characteristics with a set of reference characteristics associated with a distribution of the set of reference values.

6. The system of claim 5, wherein the set of test characteristics is indicative of at least one of a Gaussian distribution or and a log-normal distribution.

7. The system of claim 5, wherein the set of test characteristics is indicative of at least one of a mean or a spread of the distribution of the set of test values.

8. The system of claim 3, wherein the cell is collected from a patient, and the executable instructions include executable instructions to direct the data processor to:
produce an indication of a likelihood of cancer in the patient.

9. The system of claim 3, wherein the cell is collected from a patient, the population of cancerous cells corresponds to a population of metastatic cancer cells, and the executable instructions include executable instructions to direct the data processor to:
produce an indication of a likelihood of metastatic cancer in the patient.

10. The system of claim 3, wherein the cell is collected from a patient, the population of cancerous cells includes a first population of cancerous cells of a first degree of advancement and a second population of cancerous cells of a second degree of advancement, the set of reference values includes a first set of reference values associated with the first population of cancerous cells and a second set of reference values associated with the second population of cancerous cells, and the executable instructions include executable instructions to direct the data processor to:
compare the set of test values with the first set of reference values to determine a degree of correspondence between the set of test values and the first set of reference values; and
compare the set of test values with the second set of reference values to determine a degree of correspondence between the set of test values and the second set of reference values.

11. The system of claim 10, wherein the executable instructions include executable instructions to direct the data processor to:
produce an indication of a likelihood of cancer in the patient of one of the first degree of advancement and the second degree of advancement.

12. The system of claim 11, wherein the executable instructions include executable instructions to direct the data processor to:
select a therapeutic agent for the patient based on the likelihood of cancer of one of the first degree of advancement and the second degree of advancement.

13. A nanomechanical analysis system, comprising:
an expansion element;
a cantilever having a first end and a second end, the first end of the cantilever being connected to the expansion element;
a probe disposed adjacent to the second end of the cantilever, the probe being elongated and extending from the cantilever;
a detector element disposed adjacent to the second end of the cantilever;
a data processor connected to the detector element; and
a memory connected to the data processor,
wherein the expansion element is configured to move the first end of the cantilever, such that the probe applies a first stimulus to a first cell and applies a second stimulus to a second cell,
wherein the detector element is configured to produce a first output indicative of a response of the first cell to the first stimulus, and is configured to produce a second output indicative of a response of the second cell to the second stimulus, and
wherein the memory stores executable instructions to direct the data processor to:
based on the first output, determine a first set of test values for the first cell, the first set of test values being indicative of adhesiveness of the first cell with respect to the probe;
based on the second output, determine a second set of test values for the second cell, the second set of test values being indicative of adhesiveness of the second cell with respect to the probe; and
based on the first set of test values and the second set of test values, differentiate between the first cell and the second cell.

14. The system of claim 13, wherein the probe includes a tip having a radius in the range of 5 nm to 900 nm.

15. The system of claim 13, wherein the executable instructions include executable instructions to direct the data processor to:
select one of the first cell and the second cell.

16. The system of claim 13, wherein the executable instructions include executable instructions to direct the data processor to:
compare the first set of test values with a set of reference values to determine a degree of correspondence between the first set of test values and the set of reference values; and
compare the second set of test values with the set of reference values to determine a degree of correspondence between the second set of test values and the set of reference values.

17. The system of claim 16, wherein the set of reference values is associated with at least one of a population of cancerous cells or a population of non-cancerous cells.

18. The system of claim 13, wherein the executable instructions include executable instructions to direct the data processor to:
   compare the first set of test values with the second set of test values.

* * * * *